United States Patent
Newell et al.

(10) Patent No.: US 10,802,455 B2
(45) Date of Patent: *Oct. 13, 2020

(54) DYNAMIC 3D OBJECT RECOGNITION AND PRINTING

(71) Applicant: Dish Technologies L.L.C., Englewood, CO (US)

(72) Inventors: Nicholas Newell, Centennial, CO (US); Swapnil Tilaye, Westminster, CO (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/512,233

(22) Filed: Jul. 15, 2019

(65) Prior Publication Data

US 2019/0339658 A1    Nov. 7, 2019

Related U.S. Application Data

(63) Continuation of application No. 15/244,767, filed on Aug. 23, 2016, now Pat. No. 10,359,756.

(51) Int. Cl.
| | |
|---|---|
| *G05B 19/04* | (2006.01) |
| *G05B 19/048* | (2006.01) |
| *B33Y 30/00* | (2015.01) |
| *B33Y 50/02* | (2015.01) |
| *G06K 9/00* | (2006.01) |
| *G06T 19/00* | (2011.01) |

(52) U.S. Cl.
CPC ............ *G05B 19/048* (2013.01); *B33Y 30/00* (2014.12); *B33Y 50/02* (2014.12); *G06K 9/00214* (2013.01); *G06K 9/00758* (2013.01); *G06T 19/00* (2013.01); *G05B 2219/49023* (2013.01)

(58) Field of Classification Search
CPC ...... B33Y 30/00; B33Y 50/02; G05B 19/048; G05B 2219/49023; G06K 9/00214; G06K 9/00758; G06T 19/00
See application file for complete search history.

(56) References Cited

U.S. PATENT DOCUMENTS

| | | | |
|---|---|---|---|
| 8,243,334 B2 * | 8/2012 | Abeloe | B29C 64/386 358/2.1 |
| 8,414,280 B2 * | 4/2013 | Pettis | G06F 3/1226 425/150 |
| 9,229,674 B2 * | 1/2016 | Tapley | G06F 3/1211 |
| 9,420,260 B2 | 8/2016 | McGregor et al. | |
| 9,807,445 B2 * | 10/2017 | Mountain | H04N 21/44008 |
| 2006/0227364 A1 * | 10/2006 | Frank | G06Q 30/02 358/1.15 |
| 2012/0113457 A1 * | 5/2012 | Pettis | G06F 3/1288 358/1.14 |
| 2015/0045934 A1 * | 2/2015 | Kallenbach | B29C 64/00 700/120 |

(Continued)

*Primary Examiner* — Mohammed Shamsuzzaman
(74) *Attorney, Agent, or Firm* — Perkins Coie LLP

(57) ABSTRACT

Three-dimensional (3D) object manufacturing systems and methods are operable to manufacture printed 3D objects corresponding to user-selected physical objects of interest shown in a media content event that have been viewed by a user, wherein at least one 3D printer that is accessible by the user of the media device is operable to manufacture the printed 3D object corresponding to the viewed physical object of interest.

21 Claims, 4 Drawing Sheets

(56) References Cited

U.S. PATENT DOCUMENTS

| | | | |
|---|---|---|---|
| 2015/0158252 A1* | 6/2015 | Liu | G05B 19/40935 |
| | | | 700/98 |
| 2015/0165685 A1* | 6/2015 | Klappert | B29C 64/386 |
| | | | 700/98 |
| 2015/0169603 A1* | 6/2015 | Klappert | G06F 16/532 |
| | | | 700/98 |
| 2015/0172773 A1* | 6/2015 | Klappert | H04N 21/4117 |
| | | | 705/26.5 |
| 2015/0244878 A1* | 8/2015 | Macauley | G06Q 30/0207 |
| | | | 358/1.2 |
| 2016/0229123 A1* | 8/2016 | Carlson | B29C 64/386 |
| 2016/0271881 A1* | 9/2016 | Bostick | B29C 64/393 |
| 2016/0278426 A1* | 9/2016 | Davila | H04N 1/00164 |
| 2017/0072645 A1* | 3/2017 | Abeloe | B33Y 30/00 |
| 2017/0220946 A1* | 8/2017 | Thielen | B33Y 50/00 |
| 2017/0265515 A1* | 9/2017 | Davila | A23G 3/0097 |
| 2018/0150993 A1* | 5/2018 | Newell | H04N 21/4333 |

* cited by examiner

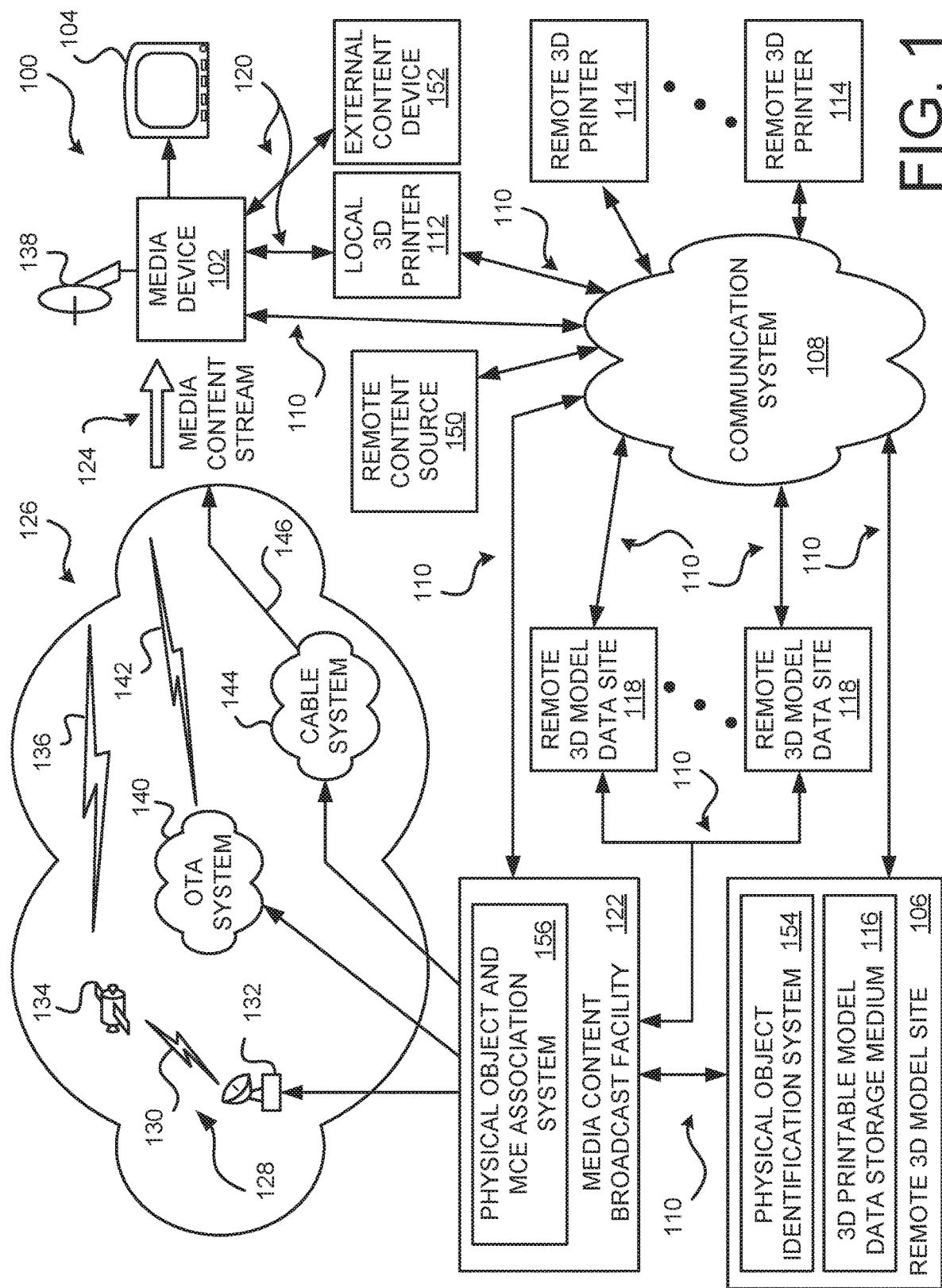

DYNAMIC 3D OBJECT RECOGNITION AND PRINTING

PRIORITY CLAIM

This patent application is a Continuation of U.S. Non-Provisional patent application Ser. No. 15/244,767, filed Oct. 23, 2016, published as U.S. Publication No. 2018/0059631, entitled "DYNAMIC 3D OBJECT RECOGNITION AND PRINTING," and issued as U.S. Pat. No. 10,359,756 on Jul. 23, 2019, the content of which is herein incorporated by reference in their entirety.

BACKGROUND

An emerging three dimensional (3D) printer technology provides for the creation of physical objects based on predefined data. Such technology is commonly referred to as 3D printing (or interchangeably referred to as additive manufacturing).

A 3D printing process employs a computer controlled system that creates a physical printed 3D object based on 3D printable model data representing the shape and appearance of the physical object of interest. That is, a 3D model is definable by 3D printable model data that can be used by a 3D printer to manufacture a printed 3D object corresponding to a physical object of interest.

The 3D printable model data may be defined using a stereo lithography (STL) format, or using another suitable 3D model data format now known or later developed. The 3D printable model data may be created using a computer aided design (CAD) system. Alternatively, the 3D printable model data may be generated from captured image data acquired by a scanner 3D system, a 3D digital image capture device (e.g., a digital camera), and/or a series of captured images that provide a series of different views of the object of interest (such that the 3D printable model data can be determined).

A variety of printed 3D object generation technologies, now known or later developed, may be used by a 3D printer device or system (generically referred to herein as a 3D printer). Non-limiting 3D printer technologies include, but are not limited to, extrusion systems such as fused deposition modeling (FDM) or fused filament fabrication (FFF), robocasting, stereo lithography (SLA), digital light processing (DLP), power bed and inkjet printing, electron-beam melting (EBM), selective laser melting (SLM), selective heat sintering (SLS), direct metal sintering (DMLS), laminated object manufacturing (LOM), direct energy deposition, and/or electron beam freeform fabrication (EBF). A variety of material may be used to create a printed 3D object of interest, such as thermoplastics, rubber, photopolymers, molding clay, plastic powders, plastic films, ceramic powders, thermoplastic powders, metal, metal alloys, metal coils or even paper.

A printed 3D object of interest, or portions thereof, may be printed using different colors and/or different materials. The materials may even be biologic (such as living tissues, cartilage or the like) or may be medicines. The printed 3D object of interest may include one or more types of mechanical and/or electronic components that are operable to perform a particular task. Such components may be external components and/or may be internal components depending the particular design specifications of the printed 3D object.

Often, 3D printers may be very complex and expensive manufacturing devices and/or systems that are used by corporations, universities or other large sized entities. However, commercially available professional grade 3D printers, or even less complex lower cost 3D printers, are now becoming increasingly available to the public and/or small companies. Such 3D printers employ one, or a limited number, of materials and/or object generation technologies. Because of their relatively smaller size, these 3D printers may be located at an office of a small business, at a residence of a user, or may even be portable.

In an entirely different technology space, media devices are configured to present visually-based media content to a user. Exemplary media devices include, but are not limited to, electronic devices such as a set top box, a television, a computer system, a smart phone, a cellular phone with a display, a game system, or the like.

Presented media content may include still and/or video images, and optionally audio content. The presented media content is a media content event, as defined herein, that presents theme-based visual and audio content to a user for their enjoyment and/or for informative purposes. Examples of such theme-based media content includes movies, films, serial programming, sporting events, documentaries, newscasts, religious programs, commercials (typically of short duration with advertising content), video games, or the like. Serial programming may present a continuing plot and/or theme, often with the same cast of actors, in a sequential episode-by-episode basis that is available periodically. Advertisements, commercials or the like may be interspersed within the media content event. However, such advertisements, commercials or the like are also a media content event, though of a smaller duration than a typical theme-based media content event. In contrast, a web page available from an internet site or the like presenting a choice of physical objects of interest for which printed 3D objects, 3D printable models, and/or 3D printable model data can be ordered and/or obtained from is not a media content event as defined herein.

Such media content will present images of physical objects to the viewing user. On occasion, a particular presented physical object seen by the user in the presented media content may have one or more corresponding 3D printable model data that could otherwise be used by a 3D printer to generate a physical object corresponding to the presented physical object seen by the user.

In the event that the viewing user sees a particular physical object presented in the media content, and in the event that the user would like to obtain a printed 3D object corresponding to the viewed object of interest, there simply is no practical way or convenient way for the user to satisfy their need to obtain the printed 3D object. In many instances, the viewing user may not even be aware that 3D printable model data corresponding to the viewed physical object seen by the user is even available. Accordingly, there is a need in the arts to enable a user to obtain a printed 3D object of interest corresponding to a presented physical object seen by the user who is viewing media content on their electronic device.

SUMMARY

Systems and methods of manufacturing three-dimensional (3D) objects are disclosed. The media content and 3D printing system is operable to manufacture printed 3D objects corresponding to user-selected physical objects of interest shown in a presented media content event that have been viewed by a user, wherein at least one 3D printer that is accessible by the user of the media device is operable to manufacture the printed 3D object corresponding to the viewed physical object of interest.

BRIEF DESCRIPTION OF THE DRAWINGS

Preferred and alternative embodiments are described in detail below with reference to the following drawings:

FIG. 1 is a block diagram of an embodiment of a media content and 3D printing system;

DETAILED DESCRIPTION

Figure 2A:
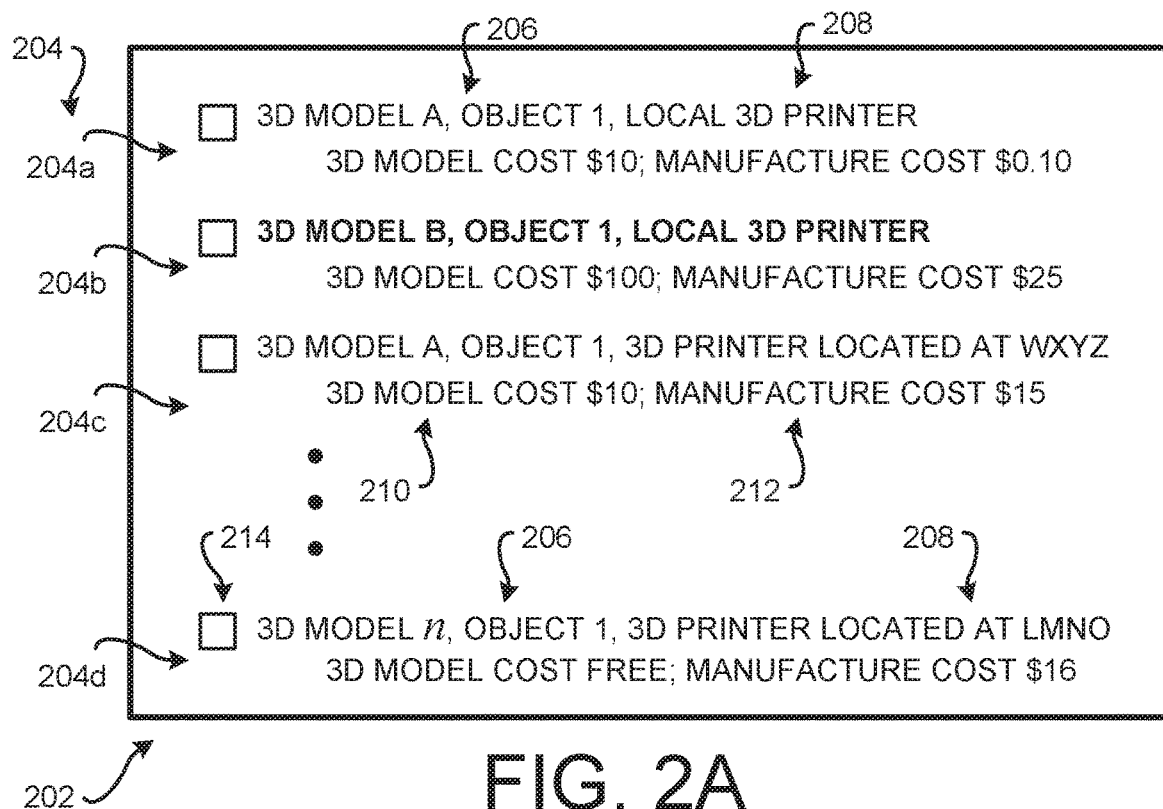
FIGS. 2A and 2B are conceptual graphical user interfaces that an example embodiment of the media content and 3D printing system presents to the user.

FIG. 1 is a block diagram of an embodiment of a media content and 3D printing system 100. A portion of the media content and 3D printing system 100 may be implemented in a user's electronic device. To conceptually illustrate embodiments of the media content and 3D printing system 100, a media device 102, such as, but not limited to, a set top box (STB) includes a portion of the media content and 3D printing system 100. Embodiments of the media content and 3D printing system 100 may be implemented in other electronic-based media devices, such as, but not limited to, a television (TV), a digital video disc (DVD) player, a digital video recorder (DVR), a smart phone, a game playing device, or a personal computer (PC) that is configured to receive and present media content that include still or video images that are presented on a display device 104 (and/or on a display of the electronic device).

Portions of the media content and 3D printing system 100 are implemented at a remote site, hereinafter referred to as the remote 3D model site 106. The remote 3D model site 106 is communicatively coupleable to a plurality of media devices 102 via a communication system 108. Communication links 110 may be established on an as-needed basis and/or may be permanent communication links. The communication links 110 may employ wire-based connection and/or may employ wireless-based technologies.

The communication system 108 is illustrated as a generic communication system. In one embodiment, the communication system 108 comprises a cellular telephone system, such as a radio frequency (RF) wireless system. Accordingly, the media device 102 and the remote 3D model site 106 include a suitable transceiver. Alternatively, the communication system 108 may be a telephony system, the Internet, a Wi-fi system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, embodiments of the media device 102 and/or the remote 3D model site 106 may be implemented to communicate using other types of communication technologies, such as but not limited to, digital subscriber loop (DSL), X.25, Internet Protocol (IP), Ethernet, Integrated Services Digital Network (ISDN) and asynchronous transfer mode (ATM). Also, embodiments of the media device 102 and/or the remote 3D model site 106 may be configured to communicate over combination systems having a plurality of segments which employ different formats for each segment of a communication link 110 that employ different technologies on each segment.

In practice, a particular media device 102 being operated by a user to present media content receives a user request for a printed 3D object. The user's request is associated with, and/or identifies, a particular viewed object of interest that is shown as an image in the presented media content. That is, the viewing user sees an image of a physical object of interest that they would like to obtain a corresponding printed 3D object of. The media device 102 communicates an initial user request to the remote 3D model site 106. The initial user request includes information corresponding to a user's request obtain a printed 3D object. The communicated information further includes at least an identifier of the media device 102 and/or the identify of the user. Also, the communicated information includes information that is used by the remote 3D model site 106 to identify the viewed physical object of interest.

In some embodiments, the initial user request identifies one or more of the 3D printers 112, 114 that the user has access to. Alternatively, or additionally, the identifying information for the media device 102 may be use to identify a local 3D printer 112 and/or one or more remote 3D printers 114 (referred generically herein as candidate 3D printers 112, 114) that the user may use to manufacture a printed 3D object that corresponds to a viewed physical object of interest. Alternatively, or additionally, the initial user request may include a list of candidate 3D printers 112, 114 that the user prefers. Alternatively, or additionally, a list of candidate 3D printers 112, 114 may have been previously communicated to and stored at the remote 3D model site 106. The candidate 3D printers 112, 114 may be identified, in some situations, based on the information that identifies the user's media device 102 and/or that identifies the user. For example, the remote 3D model site 106 may maintain or have access to a database that identifies the user, user account information, and/or the user's media device 102, and a corresponding list of associated candidate 3D printers 112, 114 that the user has access to and/or prefers.

The remote 3D model site 106, based on information that identifies one or more of the 3D printers 112, 114 that the user has access to, then identifies at least one suitable 3D printable model from the 3D printable model storage medium 116 that can be used to manufacture the printed 3D object using the identified one or more candidate 3D printers 112, 114. Many different suitable 3D printable models may be identified that correspond to the identifiable physical object of interest. Further, many different suitable 3D printable models may be identified when there are a plurality of different available candidate 3D printers 112, 114 for the user to select to manufacture the printed 3D object.

Alternatively, or additionally, once the physical object of interest has been identified from the information in initial user request, the remote 3D model site 106 may access one or more of a plurality of remote 3D model data sites 118 that have access to and/or that store 3D printable models (and data) associated with the physical object of interest identified in the user's initial request. Here, remote 3D model site 106 communicates a model request to one or more of the remote 3D model data sites 118 for a request for 3D printable model data for one or more 3D printable models that correspond to the physical object of interest of the user and that are printable by the 3D printers 112, 114 that the user has access to.

In response to the model request, the remote 3D model site 106 receives a list of 3D printable models (and/or 3D printable model data) associated with the identified physical object of interest that are available from the remote 3D model data site 118. Here, each of the plurality of identified 3D printable models uniquely correspond to a particular data format used by a particular 3D printer. There may be 3D printable models developed for many different 3D printers, wherein the user may not have access to all of these different 3D printers.

The remote 3D model site 106 then filters the plurality of available 3D printable models to identify one or more candidate 3D printable models that may be used by the candidate 3D printers 112, 114 that the user has access to. Here, each one of the plurality of identified different format 3D printable models uniquely correspond to one of the identified plurality of 3D printers that are accessible by the user. That is, the remote 3D model site 106 communicates information corresponding to the identified 3D printable models that may be used to print the 3D object using those 3D printers 112, 114 that are accessible by the user of the media device 102. The communicated information omits those other ones of the plurality of 3D printable models that are not compatible with the 3D printers 112, 114 that are accessible by the user of the media device 102.

In some situations, the particular requesting media device 102 is co-located with the local 3D printer 112 at the user's premises, such as their residence, office or other location. The media device 102 and the local 3D printer 112 are communicatively coupled together via a communication link 120 (that may be a physical connector and/or a radio frequency or infrared wireless communication link). Here, the user request information communicated from the media device 102 to the remote 3D model site 106 includes information that identifies the local 3D printer 112, and/or information that identifies a 3D printable model format and/or materials that may be used by the local 3D printer 112 to manufacture a printed 3D object. Optionally, the user request information may include a confirmation that the user wishes to use their local 3D printer 112 to print the 3D object associated with the viewed physical object of interest.

Based on the received information that identifies the viewed physical object of interest and the information that is associated with the user's local 3D printer 112, the remote 3D model site 106 identifies at least one 3D printable model that can be used by the local 3D printer 112 to manufacture a 3D object associated with the viewed physical object of interest. Once the at least one 3D printable model has been identified, then information is communicated from the remote 3D model site 106 to the media device 102 which indicates to the user the availability of the one or more 3D printable models that the user might use for the manufacture of the printed 3D object using their local 3D printer 112. Optionally, other associated information pertaining to each 3D printable model may be included.

The user may then choose one or more of the identified candidate 3D printable models that can be used by their local 3D printer 112 to manufacture the desired printed 3D object. In response to the user's selection of an available candidate 3D printable model, then data corresponding to the at least one 3D printable model is communicated from the remote 3D model site 106 to the media device 102, or alternatively, to the local 3D printer 112. Then, the local 3D printer 112 is operated to manufacture (print) the 3D object using the received 3D printable model data.

In other situations, the user may prefer to use a designated one of the remote 3D printers 114 to print the 3D object. The plurality of remote 3D printers 114 are communicatively coupleable to the remote 3D model site 106 and/or to the user's media device 102, via the communication system 108. For example, a local business may have a remote 3D printer 114 that prints 3D objects for requesting users. Here, the user may be required to pay a service fee or the like to have the designated remote 3D printer 114 manufacture a printed 3D object associated with the viewed physical object of interest. As another example, a library, university, or other public entity may have an accessible remote 3D printer 114. The user may wish to use the designated remote 3D printer 114 if they do not have their own local 3D printer 112, if their own local 3D printer 112 is not sufficiently advanced to manufacture a particular printed 3D object, if their own local 3D printer 112 does not have suitable manufacturing materials (such as a particular base material and or colors), and/or if they simply wish to discretely manufacture the printed 3D object (such as when the printed 3D object is intended by the user to be a surprise present, gift, or the like).

In such situations wherein a remote 3D printer 114 is used to manufacture a printed 3D object, information corresponding to the user's selection of a remote 3D model site 106 is communicated from the media device 102 to the remote 3D model site 106, wherein the user selection includes information that identifies the particular designated remote 3D printer 114. The communicated information may optionally include information that identifies a 3D printable model format and optionally any materials used by the designated remote 3D printer 114 to manufacture the printed 3D object. This information specifying the remote 3D printer 114 may be included in the initial user request. Alternatively, the user's selection of a particular remote 3D printer 114 may be included in a subsequent communication after the user has considered the various available suitable 3D printable models that are associated with the viewed physical object of interest.

Based on the received information that identifies the 3D printable model of interest and the information that is associated with the designated remote 3D printer 114, the remote 3D model site 106 optionally confirms that the selected at least one 3D printable model can be used by the designated remote 3D printer 114 to manufacture a 3D object associated with the viewed physical object of interest. In the event that the user specified 3D printable model cannot be used by the specified remote 3D printer 114, the remote 3D model site 106 may identify a substitute equivalent 3D printable model.

It is appreciated that the particular 3D printer 112, 114 that the user intends to use to manufacture a printed 3D object must, at some point during the manufacturing process, have the associated 3D printable model data. Once the at least one 3D printable model useable by the remote 3D printer 114 has been identified, then data corresponding to the at least one 3D printable model is provided to the designated remote 3D printer 114. The designated remote 3D printer 114 is then operated to manufacture the 3D object using the received 3D printable model data. In some situations, the 3D printable model data is communicated from the remote 3D model site 106 to the designated remote 3D printer 114 Alternatively, or additionally, the 3D printable model data is communicated from the media device 102 to the designated remote 3D printers 114 (and/or to other compatible remote 3D printers 114). Alternatively, or additionally, one of the remote 3D model data sites 118 communicates the 3D printable model data to the designated remote 3D printer 114 in response to a request or instruction provided by the remote 3D model site 106 and/or the user's media device 102. Alternatively, or additionally, the 3D printable model data may have been previously communicated to and stored by the designated remote 3D printer 114. Alternatively, or additionally, the designated remote 3D printer 114 may access previously stored 3D printable model data used in previous manufacturing operations. For example, if a particular printed 3D object is preferred by many different users, the 3D printable model data may be stored at the remote 3D printer 114 for use on an ongoing basis. It is appreciated that the remote 3D printer 114 may receive 3D printable model data for manufacture of a particular printed 3D object.

In some instances, the 3D printable model data may be communicated to and stored by the user's media device 102. That is, the 3D printable model data may have previously been received and stored at the media device 102. Accordingly, the 3D printable model data may be communicated from the media device 102 to the particular 3D printer 112, 114 that is to be used at any point in time that is desired by the user. For example, the 3D printable model data is communicated from the media device 102 to the associated 3D printer 112, 114 at a later time when the user wishes to manufacture the printed 3D object. Further, the user may repeatedly access the 3D printable model, and/or the associated 3D printable model data, to later print other like printed 3D objects on the same 3D printer 112, 114. Alternatively, or additionally, the user may later manufacture the printed 3D object using a different one of the 3D printers 112, 114 that the user has access to (so long as the format of the 3D printable model data is compatible with the later designated one of the 3D printers 112, 114).

It is appreciated that other 3D printable models associated with the viewed physical object of interest may not be suitable for use by a particular 3D printer 112, 114 that the user has access to. For example, the format of these 3D printable models may not be compatible with the 3D printers 112, 114 that the user has access to. Alternatively, or additionally, the materials used to manufacture the printed 3D object using those 3D printable models may not be available at the 3D printers 112, 114 that the user has access to. In such situations, the data associated with the other non-suitable 3D printable models is not retrieved and communicated to the media device 102 and/or the 3D printer 112, 114.

Multiple 3D printable models suitable for use by a particular 3D printer 112, 114 may be identified for a variety of reasons. As a first example of why multiple 3D printable models may be identified for a particular viewed physical object of interest, each of the multiple 3D printable models may have different levels of complexity. Consider a hypothetical situation wherein the physical object of interest viewed in a presented media content event is an automobile. A very complicated 3D printable model may provide for manufacture of a printed 3D object having very high level of detail, may provide for multiple colors, and/or may use multiple materials. For example, the detailed automobile 3D printable model data may specify particular colors for the automobile interior and for different interior features (such as the type of steering wheel or transmission shifter), may specify different exterior colors and/or features (such as automobile trims, a user-preferred color, and/or a hard top or convertible version), and/or may specify different materials (such as a plastic body, metal chrome-like bumpers, wheel covers and trimmings, and/or clear plastic windows). Such a detailed 3D printable model may be suitable for an automobile enthusiast. On the other hand, a very simple automobile 3D printable model that has limited colors, that has no interior details, and/or that has a single material may be more suitable for a child (who is not interested in such details and/or who needs a very durable toy to play with). Many other versions of automobile 3D printable models, each with differing characteristics, may be identified from many different available automobile 3D printable models that have been identified based on the indicated viewed physical object of interest, where the identified 3D printable models can be manufactured by the particular identified 3D printers 112, 114 that the user has access to.

Further, some particular 3D printable models may be available to the user for free, and other 3D printable models may be available for a fee (price). And, different 3D printable models may have different fees associated with each model. For example, a very complex and detailed 3D printable model may have a relatively higher fee (cost) to the user than the fee for a less complex and/or less detailed 3D printable model of the same automobile. A simple generic 3D printable model of the same automobile may be available for free or for a minimal cost.

Also, material costs for manufacturing a particular printed 3D object for a particular 3D printable model may vary. For example, the material costs for manufacturing a complex and detailed automobile 3D object may be relatively higher to the user because more expensive material may be used (as compared to the simple automobile 3D object that is intended to be a toy for a young child). Material costs of the manufactured printed 3D object will also be affected by the size of the printed 3D object since a large printed 3D object will require more materials that a smaller printed 3D object.

If a designated remote 3D printer 114 is used to manufacture the printed 3D object, service fees incurred by the user may vary since a more complex and technologically advance 3D printer may be required to manufacture a printed 3D object using a complex and detailed 3D printable model. Further, production costs to manufacture a printed 3D object from a particular one of the multiple 3D printable models is likely to be different. A simple 3D printable model data printed on a highly automated 3D printer 112, 114 may require little or no effort on the part of the operator. However, a complex 3D printable model data of the same viewed physical object of interest that is printed on a highly complex and/or less automated 3D printer 112, 114 may require a substantial effort on the part of the operator. Accordingly, production costs may be incurred by the user to obtain their printed 3D object in view of the greater manpower requirements and/or labor charges. That is, a higher service fee may be charged to the user to use a more expensive type or model of 3D printer.

Accordingly, the user may incur a first fee cost for obtaining a particular 3D printable model. A second fee may be incurred for the cost of materials when the printed 3D object is manufactured using the owner's local 3D printer 112 or at a designated remote 3D printer 114. When a designated remote 3D printer 114 is used to manufacture a printed 3D object, the user may further incur a third fee for the cost of manufacturing a printed 3D object from the obtained 3D printable model (because of the investment cost of the designated remote 3D printer 114, operator expenses, and/or profit margins).

In view of the potential varying costs to the user to obtain a particular printed 3D object, the user must make a decision as to which particular one of the multiple 3D printable models is to be obtained from the remote 3D model site 106, and which of the particular 3D printer 112, 114 is to be used for the manufacturing of the printed 3D object. Accordingly, once a plurality of different 3D printable models have been identified by the remote 3D model site 106, information associated with each of the identified multiple 3D printable models may be communicated to the user's media device 102 so that the user may make an informed decision regarding which particular 3D printable model will be used and/or which particular 3D printer 112, 114 will be used to manufacture the printed 3D object.

In an example embodiment, the information communicated to the media device 102 from the remote 3D model site 106 may identify cost to obtain the data for a particular 3D printable model. Further, the provided information for a particular 3D printable model may include a materials list or the like identifying materials required for manufacture of the printed 3D object using that particular 3D printable model. Since the required types of materials and/or amounts of particular materials will vary between different 3D printable models, such information is relevant to the total material cost incurred by the user. Alternatively, or additionally, an estimated cost for materials may be provided for the identified multiple 3D printable models.

If the printed 3D object is to be manufactured by the owner's local 3D printer 112, the media device 102 may use the information provided about each particular 3D printable model to compute an estimate for a material cost and/or for a manufacturing cost (such as energy costs or the like). The media device 102, in one embodiment, may estimate material costs based on known input material costs and the list of materials (that includes the required amounts of each different identified material). Optionally, a manufacturing cost may be added to the determined material costs to compute an estimated cost to the user.

If the printed 3D object is to be manufactured by a designated remote 3D printer 114, the owner of the designated remote 3D printer 114 may optionally provide an estimated cost to the user to have the printed 3D object manufactured by that designated remote 3D printer 114. The estimated cost information may be provided directly to the media device 102, and/or may be provided to the remote 3D model site 106. Estimated costs may be predefined and stored as part of the 3D printable model data that is accessed by the remote 3D model site 106. Alternatively, the 3D printable model data or associated manufacturing information may be communicated to the operator of the designated remote 3D printer 114, who is then able to provide the cost estimate to the remote 3D model site 106 and/or to the media device 102.

FIG. 2A is conceptual graphical user interface (GUI) 202 that an example embodiment of the media content and 3D printing system 100 provides to the user to facilitate the user's selection of a particular 3D printable model and/or a particular one of the candidate 3D printers 112, 114. The GUI 202 is presented to the user after the initial user request has been communicated to the remote 3D model site 106, and after a plurality of suitable different 3D printers 112, 114 that the user has access to have been identified. The GUI 202 indicates a plurality of available printing options 204 that the user may select from for manufacturing the specified printed 3D object. To conceptually illustrate possible information that is presented to the user, the printing option information identifies the local 3D printer 112 and a plurality of remote 3D printers 114 as candidate 3D printers that the user may select from for use in manufacturing the printed 3D object of interest.

The printing options 204 of the example GUI 202 present a variety of information of interest to the user pertaining to each individual printing option. Other embodiments of a GUI 202 may include additional information, less information, and/or alternative information for the printing options as illustrated in FIG. 2A. The first example information 206 of a printing option 204 identifies the 3D printable model. A name of the model and/or a textual description of the modeled object may be provided as part of the information 206.

The printing options 204 further present information 208 that indicates which particular 3D printer 112, 114 are compatible with, and therefore could use, that particular 3D printable model data. For example, the first printing option 204a indicates that the 3D printable model data corresponds to 3D model A that can be manufactured using the owner's local 3D printer 112. The second printing option 204b indicates that the 3D printable model data corresponding to 3D model B can also be manufactured using the owner's local 3D printer 112.

In contrast, the third printing option 204c indicates that the 3D printable model data corresponding to 3D model A can also be manufactured using the designated remote 3D printer 114 at location WXYZ (that the user presumably has access to). Thus, both the designated remote 3D printer 114 and the local 3D printer 112 are operable to manufacture the same printed 3D object (using the same 3D printable model data).

Any suitable indentifying information may be used to indicate to the user the identity of the designated remote 3D printer 114. Here, the designated remote 3D printer 114 is indicated by its location "WXYZ" which may be an address, a notoriously well known location, a particular business, or the like. Any suitable identifier may be presented to the user that intuitively informs the viewing user where the printed 3D object will be manufactured so that the user may later obtain the printed 3D object after it has been manufactured.

The last example printing option 204d indicates that the printed 3D object may be obtained from another remote second location ("LMNO"). Thus, the GUI 202 provides the user a plurality of different locations to choose from. Further, the last example information indicates that the 3D model n is used as the alternative second location LMNO. The second location LMNO may require another different 3D model because the remote 3D printer 114 at that location may be different from the remote 3D printer 114 at the first location WXYZ.

In some situations, the GUI 202 may not distinguish between different 3D printable models that are used at different locations because the resultant manufactured printed 3D object is identical, or is substantially similar, when manufactured at either location. However, because the remote 3D printers 114 are different from each other, each may require the 3D printable model data in a different format. Thus, if the user selects a particular location and a particular 3D model, the 3D printable model data that has a format that is compatible with that particular designated remote 3D printer 114 is communicated from the remote 3D model site 106 (or from one of the remote model data sites 118) to the media device 102 and/or to the designated remote 3D printer 114.

If a cost is associated with acquisition and/or use of the data for a particular 3D printable model, such fee information 210 may be indicated to the user by the GUI 202.

The indicated fee for a 3D printable model may be a cost to own or acquire a license for the user's own personal use of the 3D printable model data. Thus, when the 3D printable model data is communicated from the remote 3D model site 106 to the user's media device 102, the received 3D printable model data may be saved by the media device 102 (and/or may be saved into another suitable memory medium). Alternatively, the fee may be for a limited use right for the user to manufacture a single printed 3D object, or a limited number of prints of the same printed 3D object. Alternatively, or additionally, the right to use the 3D printable model data may be for a limited duration such that after some predefined period of time, use rights expire and the 3D printable model data is no longer operable to manufacture the printed 3D object.

For example, the 3D model A has an indicated cost of $10. In contrast, the indicated cost of the cost of the 3D model B has a cost of $100. Presumably, the 3D model B is considerably more complex and provides a significantly higher quality printed 3D object than that provided by the less expensive or cheaper 3D model A. Alternatively, or additionally, the lower fee of 3D model A may reflect a one-time use of that model and the higher fee for the 3D model B may be for unlimited use rights, a limited duration use, and/or for use for a predefined number of like printed 3D objects.

The last indicated 3D model n is conceptually illustrated as being a free 3D printable model. Free 3D printable models may be available for variety of reasons. For example, but not limited to, the 3D printable model data may be in the public domain, and therefore, be freely available to any user at any time. Alternatively, the free 3D printable model may be available as part of a promotion and/or may be provided free of charge if the user has purchased or obtained a related product or service. To illustrate, the printed 3D object may correspond to a movie character or a physical object shown in a movie. The associated 3D printable model data may be available free of charge as a promotion of the movie, if the user has purchased one or more tickets to see the movie at a theatre, and/or has paid to view the movie using their media device 102.

Information 212 corresponding to the estimated cost to manufacture the printed 3D object using the associated 3D printable model data may also be indicated to the user in a presented printing option 204. The first printing option 204a indicates that a printed 3D object manufactured using the 3D model A can be manufactured using the owner's local 3D printer 112 for a cost of ten cents. In contrast, the second printing option 204b indicates that a printed 3D object manufactured using the 3D model B can be manufactured using the owner's local 3D printer 112 for a cost of $25. Presumably, the printed 3D object manufactured using the 3D model B costs more because that object uses more materials and/or more expensive materials that a printed 3D object that is manufactured using 3D model A. Alternatively, or additionally, the lower cost of materials used by the user's local 3D printer 112 may have been obtained at a discount by the user. In contrast, the higher material costs for use of the remote 3D printer 114 may be based on a full retail material prices or at marked up material prices.

The third printing option 204c indicates that a printed 3D object manufactured using the 3D model A can be manufactured using the designated remote 3D printer 114 for a cost of $15. Presumably, the printed 3D object manufactured using the 3D model A costs more to manufacture at the designated remote 3D printer 114 because of service fees or the like charged by the business that owns and/or that operates the designated remote 3D printer 114. The owner may opt for the this third printing option 204c in the event that they wish to obtain the printed 3D object discretely or if they do not have their own local 3D printer 112.

In the example GUI 202, a graphical icon 214 is indicated next to each of the different identifying information. The graphical icon may be a presented image that indicates the appearance of the printed 3D object to the viewing user. For example, but not limited to, the image may be an artist's rendering or a photograph of an example printed 3D object that has been manufactured using the associated 3D printable model. The image may be a still image, a series of still images, or even a short video clip of the printed 3D object.

The GUI 202 is interactive with the viewing user to enable the user's selection of a particular one of the presented printing options 204 having a particular 3D printable model and/or a particular 3D printer 112, 114 that the user wishes to have manufacture the printed 3D object of interest. The selection of one of the printing options 204 may be made by the user by navigating about the GUI 202. Such navigation about the GUI 202 may be similar to the way the user navigates about a presented electronic program guide (EPG). For example, controllers on a remote control unit or the like may be used to navigate to and focus on a particular option of interest. A currently focused printing option may be indicated in a variety of manners. For example, the second printing option 204b in the exemplary GUI 202 is presented using a bold font, thereby intuitively informing the user that this option is the currently focused printing option. Alternatively, or additionally, a line around the focused to printing option, shading behind the focused to printing option, a bright and/or a different colored font of the focused to printing option, may be used to intuitively inform the user which of the selectable printing options 204 is currently focused. Any suitable indicator may be used in the various embodiments.

Often, and particularly if the font size of the information presented in the printing options 204 is fixed so as to be easily visible to the user, a greater number of printing options may be identified by the remote 3D model site 106 than a number of printing options 204 that can be practically displayed on the GUI 202. In such cases, multiple pages of different printing options 204 may be available for the user to view and consider. Here, a page of the GUI 202 presents a limited number of printing options 204, wherein other pages of the GUI 202 present the other available printing options 204. Alternatively, or additionally, the user may scroll up and/or down through a listing of the available printing options 204.

Figure 2B:
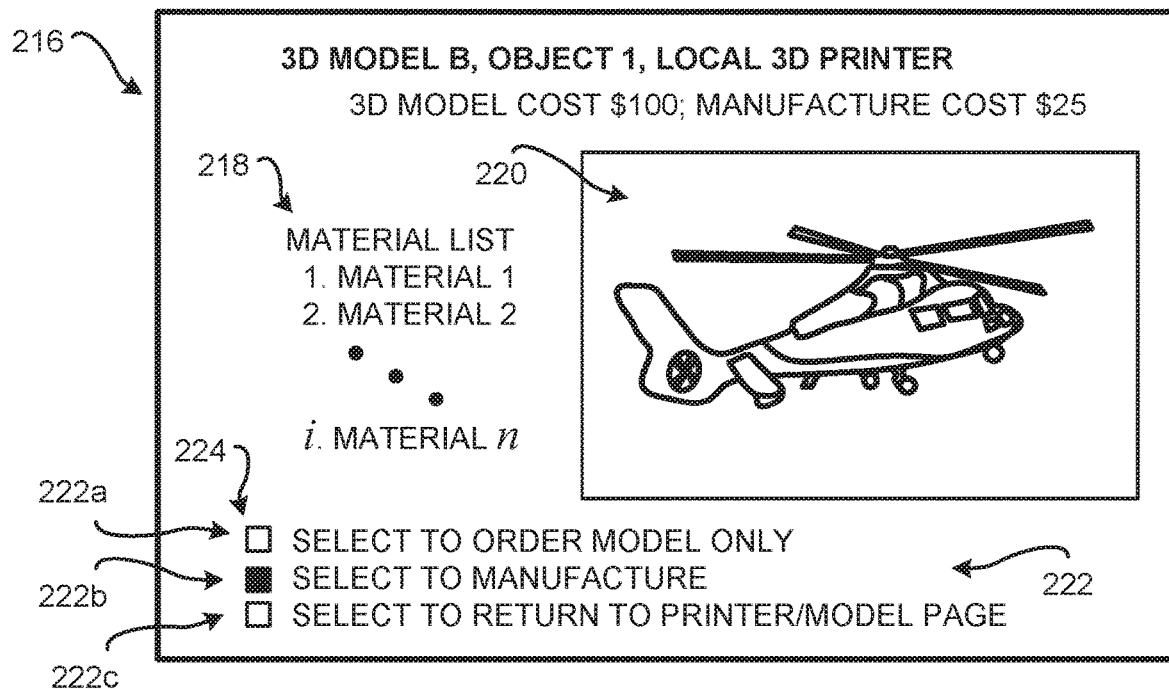

Some embodiments may be configured to present additional supplemental information for a focused printing option 204. FIG. 2B conceptually illustrates an example second GUI 216 that presents additional supplemental information to the user in response to a selection of a printing option 204 that is currently focused to the presented GUI 202 of FIG. 2A. Other embodiments of a GUI 216 may include additional information, less information, and/or alternative information for the printing options 204 as illustrated in FIG. 2B.

The example GUI 216 presents an optional list of materials 218 that will be used in the event that the associated 3D printable model is selected for manufacturing of the printed 3D object of interest. The optional list of materials 218 may identify the base material(s) and any coloring materials such as paint of the like that will be used in the manufacture of the printed 3D object that is required by that associated 3D printable model data. The list of materials 218 may be a complete listing, or may be a partial listing of major or significant materials. Thus, the viewing user intuitively understands the nature of the printed 3D object of interest, it's complexity/simplicity, and/or the basis of any specified costs to obtain the printed 3D object using that particular 3D printable model data manufactured by the designated candidate 3D printer 112, 114.

The example GUI 216 optionally includes a larger sized image 220 of the printed 3D object that will be manufactured by that particular 3D printable model. The image 220 may be a still image, a series of still images, or even a short video clip of the printed 3D object. To illustrate, an image (drawing or photograph) of a complex and detailed model helicopter is shown in the image 220 to visually indicate to the user various characteristics of the manufactured printed 3D object. Thus, the user can better make their selection of a particular 3D printable model and/or from among different 3D printers 112, 114 based on their preferences and intended purposes for the printed 3D object of interest.

The GUI 216 optionally has a region of selectable options that will initiate acquisition of the identified 3D printable model and/or will initiate manufacture of the printed 3D object. For example, a first selectable option 222a, if selected by the user, will cause the identified 3D printable model to be acquired (ordered). In response to the user's selection of this option 222a, the corresponding 3D printable model data will be communicated from the remote 3D model site 106 (or from a remote 3D model site 106) to the local 3D printer 112 and/or the designated remote 3D printer 114.

A second selectable option 222b, if selected by the user, will initiate the manufacture of a printed 3D object based on the identified 3D printable model and designated candidate 3D printer 112, 114. In response to the user's selection of this option 222b, the 3D printable model data will be communicated from the remote 3D model site 106, the media device 102, and/or a remote 3D model site 106 to the designated candidate 3D printer 112, 114 such that manufacturing of the printed 3D object is then commenced.

Third selectable option 222c, if selected by the user, will return to presentation of the GUI 202 of FIG. 2A. Selection of this option 222c would be made by the user if the user decides to view, consider, and/or use a different 3D printable model and/or a different one of the available 3D printers 112, 114.

In the example GUI 216, a plurality of hotspot areas 224 are optionally illustrated adjacent to each of the indicated selectable options 222. The user may navigate to the desired selectable option 222 or even to a plurality of selectable options 222. To conceptually illustrate operation of the GUI 216, the hotspot 224 associated with the manufacturing selection option 222b is illustrated using a black shading to indicate the user's selection. Any suitable user selection and/or indication means, such as coloring, background characteristic, or the like, may be used by various embodiments to indicate a user selection of that particular selectable option 222. Alternatively, or additionally, indications described above to indicate the focusing on printing options 204 (FIG. 2A) may be used to indicate the user's selection. In the simplified GUI 216, in response to the user's selection of the black-shaded hot spot, the process of manufacturing the printed 3D object may be initiated. Alternatively, or additionally, the process of manufacturing may be initiated after the user pays one or more fees that may be charged for access to the associated 3D printable model and/or for use of a designated remote 3D printer 114.

Returning to the description of FIG. 1, an exemplary media content delivery system is broadly described. To facilitate disclosure of an exemplary embodiment of the media content and 3D printing system 100, delivery of media content events to a plurality of media devices 102 is briefly described. A media content provider receives media content at its media content broadcast facility 122, in the form of a plurality of media content events, from a plurality of local program providers or other content providers. The provided media content events may include, but are not limited to, a television program, a newscast, a broadcast sports event, a movie, or the like. The media content is typically provided in the form of a video stream, a synchronized audio stream, and optional streams of other information, herein referred to interchangeably as a media content stream 124.

The media content provider processes the received media content events into data streams as necessary to prepare the media content events for transmission to the plurality of media devices 102. For example, commercials or the like may be incorporated with a particular media content event. Alternatively, or additionally, the media content may be associated with identifiers, such as channel number and/or station call signs. The processed media content is aggregated and is broadcast over a broadcast system 126 that is received as a media content stream 124 at the media devices 102.

A variety of types of communication systems may be used for the broadcast system 126 to communicate the media content stream 124 to the media devices 102. The broadcast system 126 may employ a satellite system 128 wherein an uplink signal 130 is communicated from a ground antenna 132 up to one or more satellites 134. Each of the exemplary satellites 134 broadcast a wireless satellite signal 136 down to a receiver antenna 138 that is coupled to the media device 102. The media device 102 receives the media content stream 124 from the receiver antenna 138.

Alternatively, or additionally, the broadcast system 126 may employ an over the air (OTA) system 140 wherein a wireless signal 142 is communicated using a wireless signal format that is received by the receiver antenna 138. The media device 102 then receives the media content stream 124 from the receiver antenna 138.

Alternatively, or additionally, the broadcast system 126 may employ a cable system 144 wherein a wire-based signal is communicated using a suitable cable 146 or the like that is communicatively coupled to the media device 102. Non-limiting examples of the cable 146 include a fiber optic cable, a coaxial cable, and telephone line. The media device 102 then receives the media content stream 124 via the cable 146.

The media content stream 124 may also be received by the media device 102 in other manners. In an exemplary embodiment, the media content provider is communicatively coupled to the media device 102 via the exemplary communication system 108. The media content stream 124 may then be received by the media device 102 via a communication link 110 that establishes connectivity of the media device 102 to the media content broadcast facility 122 via the communication system 108.

As another non-limiting example, a remote content source 150, such as an Internet site or the like, may provide the media content stream 124 to the media device 102 over the communication system 108 and via the established communication links 110.

Alternatively, or additionally, the media device 102 may be communicatively coupled to an external content device 152 via a communication link 120. Non-limiting examples of an external content device 152 include, but are not limited to, a portable memory medium, a digital video disc player, a video cassette recorder, or the like. Alternatively, or additionally, received media content events may be saved onto a memory medium (not shown) residing within the media device 102.

Regardless of the source of a particular media content event, a user of the media device 102 may choose to operate the media device 102 to present a received media content event on a media content presentation device 104 such as the exemplary television. When the user is viewing the presented media content event, the user may see an image of a physical object that they then become interested in obtaining a printed 3D object of.

When the user becomes aware of a physical object that they have viewed in the presented media content event, and then becomes interested in obtaining a corresponding printed 3D object of interest, embodiments of the media content and 3D printing system 100 are configured to receive a user request indicating the user's interest in obtaining the printed 3D object of interest (interchangeably referred to herein as the initial user request). Therefore, the information corresponding to the initial user request that is communicated from the media device 102 to the remote 3D model site 106 must include some suitable means of identifying the viewed physical object of interest.

Once the object of interest has been identified, the remote 3D model site 106 can then optionally communicate information back to the media device 102 that indicates the identified physical object of interest. For example, an optional response from the remote 3D model site 106 may include an image of the identified physical object of interest and/or descriptive text that presumably describes the identified physical object of interest. The user may then operate their media device 102 to generate a confirmation message that is sent back to the remote 3D model site 106. Then, the remote 3D model site 106 may begin the process of identifying candidate 3D printable models that may then be presented as possible selection options 204 in the GUI 202 (FIG. 2).

In some situations, the initial user request includes information that identifies the physical object of interest with particularity. For example, the initial user request may include a specific identifier or the like that unambiguously identifies the user's indented physical object of interest. For example, the initial user request may specify the character name of an actor or animated character. As another non-limiting example, the initial user request may specify the name of a notoriously well known physical object, such as a building, a vehicle, or the like. In such situations, the remote 3D model site 106 may immediately begin the process of identifying candidate 3D printable models based in the specified identifier of the viewed physical object of interest. Identified candidate 3D printable models may then be presented as possible selection options 204 in the GUI 202.

Identification of the physical object of interest may be performed in a variety of other manners by the various embodiments of the media content and 3D printing system 100. In an example embodiment, the user may initiate a capture of a presented image of the media content event that includes an image of the physical object of interest. Such a captured image, or screen shot, is communicated from the media device 102 to the remote 3D model site 106. Alternatively, or additionally, a relatively short video clip of the presented media content event may be captured and included as part of the initial user's request.

In such situations, the remote 3D model site 106 includes an optional physical object identification system 154. The physical object identification system 154 is configured to receive and analyze image information received in the initial user request to identify at least one physical object of interest that is shown in the image information. Any suitable object recognition algorithm and/or object recognition system may be used by the various embodiments.

For example, the user may be viewing a media content event that, during some point in the presentation of the media content event, includes a scene of a helicopter (the physical object of interest). The user may initiate capture of an image (or capture of a short video clip) of that scene in the presented media content event. The physical object identification system 154 then analyzes the image and identifies the helicopter as being the presumed viewed object of interest.

Optionally, the remote 3D model site 106 may then communicate information back to the media device 102 information that indicates that a helicopter has been indentified from the provided image information for confirmation from the user. If multiple physical objects are identified from the analyzed image information, the multiple identified physical objects may be indicated to the user. In some situations, the information indicating the identified physical object of interest may not need to be communicated if the physical object of interest is identified with a high degree of accuracy and reliability.

The media device 102 then presents information indicating the identified physical object(s) to the user. For example, an image of the identified helicopter, or another similar helicopter, is presented to the user by the media device 102. Alternatively, or additionally, descriptive textual information describing the identified physical object of interest is presented to the user. The user may then confirm that the physical object of interest has been correctly identified by the physical object identification system 154. If multiple physical objects have been identified as possible candidate physical objects of interest, the user may select one or more of the identified candidate physical objects. The user's confirmation and/or selection is communicated from the media device 102 to the remote 3D model site 106, wherein the remote 3D model site 106 may begin the process of identifying candidate 3D printable models associated with the confirmed object.

The physical object identification system 154 may be any suitable object identification system now known or later developed that is configured to identify physical objects from image information. Such a system may include a processor system, a memory system, and object recognition logic (not shown). Received image information is analyzed by the processor system while executing the object recognition logic to identify one or more candidate physical objects from the received image information. Information pertaining to the identified candidate physical objects (video information and/or textual descriptions) may then be provided to the remote 3D model site 106, which may then begin the process of identifying candidate 3D printable models.

The physical object identification system 154 is illustrated as residing at the remote 3D model site 106. In other embodiments, the physical object identification system 154 may reside remotely from the remote 3D model site 106. Such a remote physical object identification system 154 would receive image information from the remote 3D model site 106 and/or directly from the media device 102. Information pertaining to the identified candidate physical objects (video information and/or textual descriptions) may then be communicated to the remote 3D model site 106 and/or the media device 102, which may then begin the process of identifying candidate 3D printable models.

In some implementations, the physical object identification system 154 may reside at the media device 102. In such an embodiment, the physical objects are identified locally by the media device 102 based on a user's input or instruction. The user may optionally confirm that the correct candidate physical object has been identified before the initial user request is generated. Then, the initial user request that is communicated to the remote 3D model site 106 would contain information that identifies the physical object of interest with particularity.

Alternatively, or additionally, the user may input information that is used to identify the physical object of interest. For example, a keyboard may be operated by the user to input textual information specifying or describing the physical object of interest. Here, the user may type in the name of a character, actor, object or the like. Alternatively, or additionally, the user may type in a general description of the physical object of interest, wherein the remote 3D model site 106 identifies one or more candidate 3D printable models.

Alternatively, or additionally, a GUI type interface may be used by the user to indicate a physical object of interest that is being presented in an image of the media content event. For example, the user may pause presentation of the media content event so that an image of the physical object of interest is shown on the paused image. Then, the user may operate a mouse or other pointing system to selectively indicate the physical object of interest that is shown in the paused image. In some applications, the media device 102 may optionally process the still image that the user is operating on to identify the physical object of interest. For example, once the user has indicated the physical object of interest, the image may be cropped so that it contains only the identified physical object of interest (thereby cropping out other portions of the image that may otherwise contain images of other objects that the user is not interested in). The media device 102 may then provide this image information as part of the initial user request that is communicated to the remote 3D model site 106.

Alternatively, or additionally, the media content event itself may include information that is associated with pre-defined physical objects for which 3D printable models are available. In an example embodiment, during presentation of the media content event, the viewing user may be notified that at least one 3D printable model is available for a particular physical object that is currently being shown in the presented media content event. For example, but not limited to, a pop up window may be presented to the user when a particular physical object is being shown during presentation of a scene of a presented media content event. The pop up window may include graphical and/or textual information informing the user about available 3D printable models.

In response to a selection made via the pop up window by the user, such as might be made using a remote control or the like, the initial user request may then be generated. The initial user request is then communicated to the remote 3D model site 106 in response to the user's selection. The initial user request generated in response to the user's selection via the pop up window would include information associated with the pop up window. Such information used to generate and present a pop up window, and the associated information that identifies the object of interest, may be embedded into the media content event data stream at any suitable place, such as in the metadata, closed captioning data, or vent the audio/video stream itself.

In some situations, the media device 102 may store the user's selection for later consideration by the user, such as after the conclusion of the presentation of the media content event or even at a later point in time of the user's choosing. Then, a user selection confirmation GUI may be presented to the user that indicates the previous user's selection. If multiple different physical objects of interest have been selected by the user at various times during presentation of the media content event, these multiple candidate physical objects may be indicated in the presented user selection confirmation GUI. The user may then confirm their selection, and/or make particular selections among the plurality of previously selected physical objects, that the user has continued interest in. This user selection confirmation GUI may be similar to the above-described GUI 202 (FIG. 2A) or GUI 216 (FIG. 2B), though specific detailed information about available models may be optionally omitted (since the remote 3D model site 106 has not yet begun the process of identifying candidate 3D printable models). In response to the user's confirmation made via a presented confirmation GUI, the initial request is generated and communicated from the media device 102 to the remote 3D model site 106.

Alternatively, or additionally, information identifying one or more specific available 3D printable models may be included as part of the data of a media content event. Information about particular 3D printable models may be embedded into the media content event data stream at any suitable place, such as in the metadata, closed captioning data, or the audio/video stream itself. Thus, if the user selects that particular physical object during presentation of the media content event, the 3D printable model can be accessed from the media content event itself. The information may be presented in the user selection confirmation GUI and/or the GUI 202 (FIG. 2) at the time of selection (wherein presentation of the media content event may be optionally paused) and/or may be presented after the conclusion of the presentation of the media content event. The user may opt to select that particular 3D printable model(s) via the user selection confirmation GUI or the GUI 202 such that the process of acquisition of the selected 3D printable model(s) is initiated (and/or such that the process of manufacturing the printed 3D object of interest at a designated one of the 3D printers 112, 114 commences).

Optionally, the 3D printable model data associated with available 3D printable models may be incorporated into the media content event itself. The 3D printable model data may be embedded into the media content event data stream at any suitable place, such as in the metadata, closed captioning data, or even the audio/video stream itself. Thus, acquisition of the 3D printable model is automatic in that the 3D printable model data has been received or is currently being received in the media content event. The media device 102 may then store the 3D printable model data that has been received in the media content stream 124.

In embodiments that optionally include information pertaining to available 3D printable models (and/or the 3D printable model data) residing in a presented media content event, such information must be added into the media content stream 124 prior to the broadcasting of the media content stream 124 to the plurality of media devices 102 via the broadcast system 126. In an example embodiment, the media content broadcast facility 122 includes an optional physical object and media content event (MCE) association system 156. The physical object and MCE association system 156 is configured to process a received media content event into a modified media content event that includes the 3D printable models (and/or the 3D printable model data).

The physical object and MCE association system 156 generates information identifying particular physical objects that are being shown in a particular media content event. In an example embodiment, the information about the available 3D printable models (and/or the 3D printable model data) is inserted into the stream of media content for the media content event at a point that corresponds with presentation of the associated physical object of interest. Then, the modified media content event is broadcast to the plurality of media devices 102 instead of, or concurrently with, the original version of the media content event. When the modified media content event is being presented to the user, and more particularly when the presentation of the physical object of interest occurs, the user is able to view the physical object of interest, and then indicate whether or not they are interested in obtaining a printed 3D object that corresponds to the physical object of interest that is being presented in the modified media content event.

Alternatively, or additionally, the MCE association system 156 may insert a trigger into the media content stream 124 to indicate to a viewing user that a presented scene of the media content event is presenting an image of a physical object that has at least one or more available 3D printable models (and/or the 3D printable model data) that are available to manufacture a printed 3D object that corresponds to the presented physical object of interest. The trigger is data that is inserted into the video stream portion, the audio stream portion, the closed captioning stream portion, and/or the metadata portion of the media content event being communicated in the media content stream 124.

The trigger data, when received at the media device 102, causes the media device 102 to perform a proscribed operation in accordance with the trigger data. In an example embodiment, the trigger data causes the media device to present an icon or other visual graphic element on the display, such as a display of the media device 102 or a display of the media presentation system 104. Preferably, but not required, the icon or other visual graphic element is presented on the display concurrently with presentation of the media content event. Alternatively, or additionally, the trigger data may include link information, such as a hypertext markup language (html) address or the like, that causes the media device 102 to access a remote site (such as the remote 3D model site 106 and/or the remote 3D model data sites 118), that causes the media device 102 to communicate a request to the accessed site for the graphical information, and then that causes the media device 102 to retrieve graphical information corresponding to the icon or other visual graphic element that is to be presented on the display.

Here, the trigger data includes graphical information used to render the image of the icon or other visual graphic element on the display, and control information that causes the media device 102 to present the icon or other visual graphic element on the display. Accordingly, the placement of the trigger in the streaming media content event generally corresponds to the location of the particular scene showing the physical object of interest. For example, the trigger data may be embedded into the media content event when the physical object of interest is initially being shown (or at a point prior to when the physical object of interest is being shown so that sufficient processing time is available to the media device 102). Thus, when the viewer sees the physical object of interest in the presented media content event, they also see presentation of the icon or other visual graphic element on the display. The trigger data may also include a duration of time that the icon or other visual graphic element is to be presented on the display.

The icon or other visual graphic element that is presented on the display is configured to be relatively noticeable to the user. Thus, any suitable color, size and/or form of the icon or other visual graphic element may be used. A flashing and/or higher light intensity may be used to present the icon or other visual graphic element (or a portion thereof). In an example embodiment, the icon or other visual graphic element appears as an indicating arrow, pointer or the like that is presented in proximity to and pointed towards the image of the physical object of interest being presented in the scene of the media content event. Alternatively, or additionally, the icon or other visual graphic element may include descriptive text that informs the user about the available 3D printable models (and/or the 3D printable model data). Multiple icons or other visual graphic elements may be used in some situations (such as a graphical icon and separately presented textual information).

When the user notices the presentation of the icon or other visual graphic element on the display, the user may provide a selection or other suitable input that begins generation of the initial user request which initiates the process of acquiring the available 3D printable models (and/or the 3D printable model data). The icon or other visual graphic element on the display may be presented in a corner of the display so as to not substantially interfere with the user's experience in viewing the presented media content event. In such an example embodiments operation of the feature of presenting the icon or other visual graphic element on the display when a trigger is received may be selectable by the user. If the user is not interested in viewing the icon or other visual graphic element on the display, operation of the trigger feature may be disabled by the user. On the other hand, the user may enable operation of this trigger feature so that the icon or other visual graphic element is presented on the display with the presentation of the media content event when triggers are received.

In another situation, the trigger may pause presentation of the media content event, and replace or overlay the media content event with a larger icon or other visual graphic element on the display that visually indicates to the user that one or more 3D printable models (and/or the 3D printable model data) are available. Such a visual graphic element may present images of the printed 3D object that the user could have manufactured. After the user selects or deselects the presented icon or other visual graphic element on the display, presentation of the media content event may resume. In such example embodiments, operation of this feature may be selectable by the user. If the user is not interested in pausing presentation and viewing the icon or other visual graphic element on the display, operation of the feature may be disabled by the user. On the other hand, the user may enable operation of this feature so that the icon or other visual graphic element on the display while presentation of the media content event is paused.

In an example embodiment, presentation of the icon or other visual graphic element on the display continues for a predefined duration of time, such as a few seconds or the like. Alternatively, or additionally, presentation of the icon or other visual graphic element on the display may continue during presentation of the scene(s) that is showing the physical object of interest. After the physical object of interest is no longer being shown in the scene of the presented media content event, presentation of the icon or other visual graphic element on the display may conclude. (However, presentation of the icon or other visual graphic element on the display may continue for some predefined duration after the physical object of interest is no longer visible so that the user has adequate time do decide whether they are interested in acquiring the available 3D printable models and/or the 3D printable model data.) If the same physical object of interest is shown in a different scene, the icon or other visual graphic element may again be presented on the display.

In some embodiments, the physical object and MCE association system 156 may be remotely located from the media content broadcast facility 122 at another electronic device or system that is communicatively coupled to the media content broadcast facility 122. In an example alternative embodiment, the physical object and MCE association system 156 resides at the remote 3D model site 106. In such embodiments, the remotely located physical object and MCE association system 156 accesses a particular media content event, selectively adds in the 3D printable models (and/or the 3D printable model data) and/or triggers to generate the modified media content event. The generated modified media content event is then communicated to the media content broadcast facility 122 for broadcasting to the plurality of media devices 102.

Alternatively, or additionally, a modified media content event may be provided to the media device 102 in other manners. For example, the modified media content event may be stored onto a memory medium, such as a flash drive memory or a digital video disk (DVD) which is then accessed by the external content device 152. Alternatively, or additionally, the modified media content event may be provided to and then stored by the remote content source 150. At some later point in time of the user's choosing, the modified media content event may then be communicated from the remote content source 150 to the media device 102 via the communication system 108.

In some applications, the 3D printable models (and/or the 3D printable model data) of the modified media content event are incorporated into the end of, or after a concluding portion of, the modified media content event. When presentation of the media content event concludes, a suitable GUI is generated and presented to the user indicating the available 3D printable models (and/or the 3D printable model data) that has been received at the media device 102. Such a GUI may be the same as, or similar to, the above-described confirmation GUI or GUI 202 (FIG. 2). Accordingly, the user is able to intuitively understand which 3D printable models (and/or the 3D printable model data) pertaining to the presented media content event are available to them. If the user is interested in one or more of the associated physical objects shown during presentation of the media content event, the user may then obtain a printed 3D object of interest corresponding to the particular physical objects that have been presented in one or more scenes of the media content event.

Alternatively, or additionally, a user may be informed of available 3D printable models (and/or the 3D printable model data) for a particular media content event that they are viewing, have previously viewed, and/or have simply heard about from other sources such as advertisements, promotions, news cast or even their friends, associates or relatives. In this situation, the initial user's request includes identifier information, such as a title or the like, that identifies a particular media content event of interest. The remote 3D model site 106 identifies one or more physical objects that have available 3D printable models (and/or 3D printable model data) based on the specified media content event. Information corresponding to the various identified 3D printable models (and/or 3D printable model data) for the identified physical objects that can be printed on one or more of the 3D printers 112, 114 that are accessible by the requesting user is communicated to the user's media device 102. Then, the GUI 202 (FIG. 2) may be presented to the user so that they may make an informed selection of one or more available 3D printable models (and/or the 3D printable model data) that they are interested in.

For example, a popular children's animated movie may include a plurality of different characters and other objects (such as a castle, animals, vehicles or the like). One or more 3D printable models (and/or 3D printable model data) may be available for each of these different characters and other objects. Here, a particular character in the media content event may have a plurality of different associated 3D printable models (and/or 3D printable model data) corresponding to different sizes and/or different degrees of complexity. In response to receiving the initial user request that identifies the particular media content event, the remote 3D model site 106 communicates information about the available 3D printable models (and/or the 3D printable model data) to the media device 102. The media device 102 may then present this information to the user using the GUI 202 or a similar GUI. The user may then select one or more of the available 3D printable models (and/or the 3D printable model data) such that they may obtain a printed 3D object of selected ones of the different characters and/or other objects.

Alternatively, or additionally, the user may specify particular different characters and other objects that are in a media content event that they are viewing, have previously viewed, and/or have simply heard about from other sources. For example, the user may input the name of a particular character or object. The initial user request would include the information identifying the indicated different character(s) and/or other object(s) of interest. The remote 3D model site 106 would then identify the available 3D printable models (and/or 3D printable model data) for the specified character(s) and/or other object(s) of interest. The information associated with the identified 3D printable models (and/or 3D printable model data) may then be communicated to the media device 102, wherein the information is then presented to the user for their consideration.

In various embodiments, an optional security process or parental control feature may be included at the media device 102 and/or the remote 3D model site 106 to limit a user's access to obtaining 3D printable models and/or to obtaining printed 3D objects. A security password or the like from an authorized user would be required before 3D printable models are identified, purchased and/or obtained. Also, the authorization may be required before printed 3D objects are manufactured. For example an authorized user may be a parent or other responsible adult. Thus, children cannot view an animated media content event, and then order one or more printed 3D objects (in the absence of their parent's permission).

Figure 3:
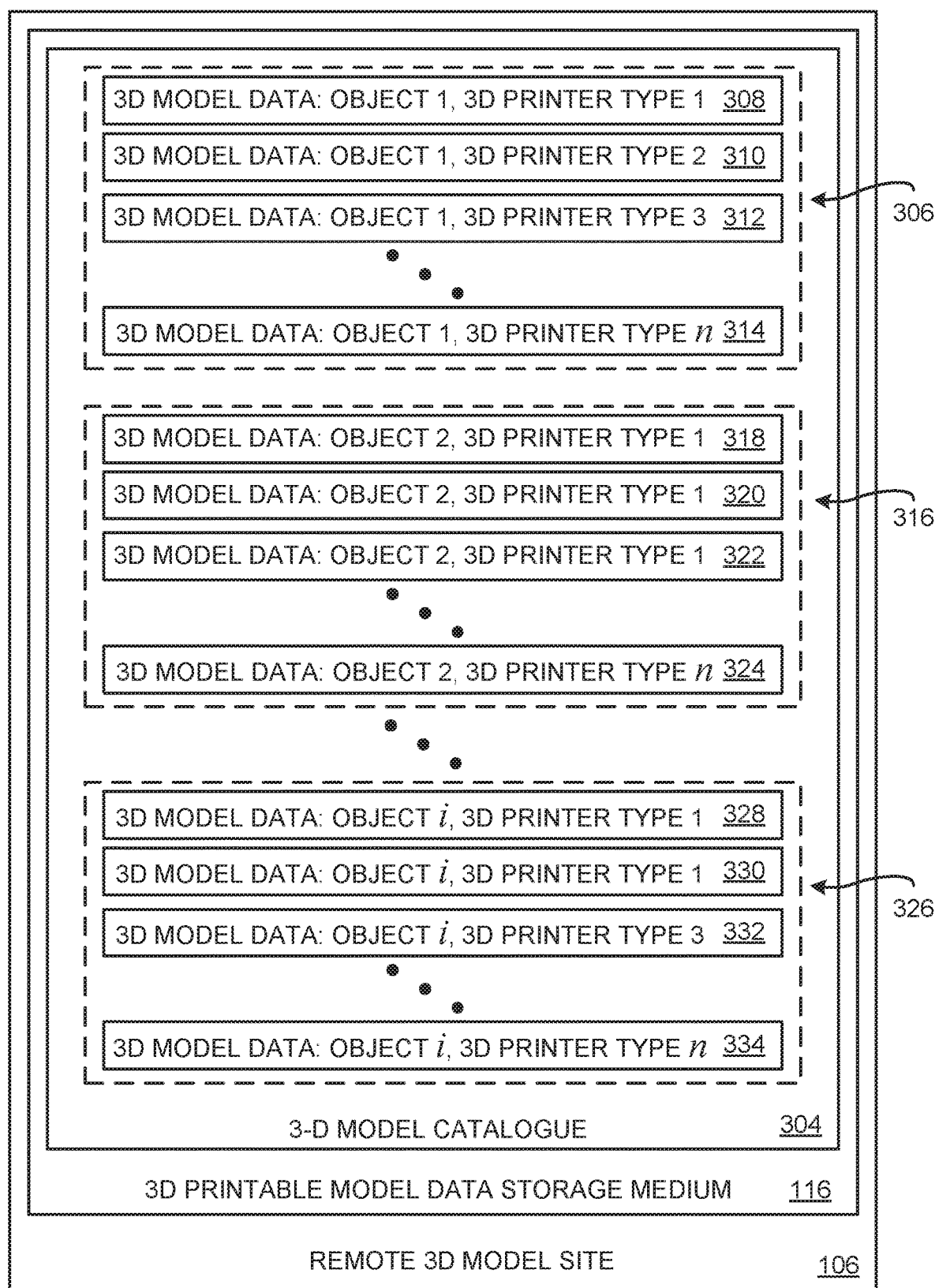
FIG. 3 is a conceptual illustration of a data storage system that stores a plurality of different 3D printable model data for various printable 3D objects.

FIG. 3 is a conceptual illustration of a data storage system 302 that stores a plurality of different 3D printable model data for various printable 3D objects. In an example embodiment, the data storage system 302 resides at the remote 3D model site 106 in the 3D printable model data storage medium 116. Alternatively, or additionally, the data storage system 302 may reside remotely at the remote 3D model data sites 118. The data storage system 302 may be implemented in a distributed manner, wherein portions of the data storage system 302 are implemented using different memory media and/or reside at different locations.

To conceptually illustrate an example embodiment of the data storage system 302, information is arranged logically using a catalogue-based system. Any suitable cataloguing system or methodology may be used in the various embodiments. Some embodiments may employ a relational database system or methodology.

As noted above, any particular physical object may have a plurality of different associated 3D printable models. Each different 3D printable model may provide for a printed 3D object that has a unique size, color, material composition, complexity or the like that is different from other manufactured printed 3D objects of the same physical object. Each different 3D printable model is identified by a unique identifier. Further, data formats of a particular 3D printable model may vary so as to accommodate different types of 3D printers 112, 114 (even though such different formatted 3D printable models may result in identical or substantially similar printed 3D objects). Accordingly, for any one physical object, there may be many different associated 3D printable models that may be used to manufacture different printed 3D objects of that particular physical object. In the various embodiments, the data storage system 302 stores the 3D printable model data for each of the different 3D printable models for the particular physical object.

Further, 3D printable models may have been created and stored from many different physical objects. Accordingly, the data storage system 302 may store a plurality of 3D printable model data for each one of a plurality of different physical objects.

The example data storage system 302 conceptually illustrates one possible form of stored 3D printable model data for a plurality of different objects. For explanation purposes, the 3D printable model data for a particular physical object are illustrated as being grouped together in the 3D model catalogue 304.

However, the 3D printable model data need not be grouped together, and may be distributed through different memory media (and/or may be stored in the same or different locations). For example, selected 3D printable model data may reside at the remote 3D model site 106 for a particular physical object, while other 3D printable model data for the same physical object may be located elsewhere, such as at one or more of the remote 3D model data sites 118.

In some embodiments, data for one or more 3D printable models may be stored at a first media device 102, and then may be accessed by a second media device 102, the remote 3D model site 106, and or the 3D printers 112, 114 based on a peer-to-peer system. Under such a peer-to-peer architecture, the remote 3D model site 106 may be operable to manage and track the storage of individual 3D printable model data at selected media devices 102 and/or at other memory media.

Here, the 3D model catalogue 304 would include link and access information to provide access to the data for remotely stored available 3D printable models (and/or the 3D printable model data). Thus, the information in the 3D model catalogue 304 may include specific link information, such as an html address or the like, that initiates access to a remote site (such as the remote 3D model site 106 and/or the remote 3D model data sites 118), to communicate a request to the accessed site for the graphical information, and then to retrieve associated 3D printable model (and/or the 3D printable model data).

In the conceptual illustrated data storage system 302, a plurality of 3D printable model data for a single physical object (denoted as "object 1") resides in a first portion 306 of the 3D model catalogue 304. The conceptual first 3D printable model data 308 corresponds to a first 3D printable model that may be used to manufacture a first printed 3D object of the associated first physical object using a first type of 3D printer (denoted as "3D printer type 1"). Similarly, a conceptual second 3D printable model data 310 corresponds to a second 3D printable model that may be used to manufacture a second printed 3D object of the associated first physical object using a second type of 3D printer (denoted as "3D printer type 2"). Here, the first and second types of 3D printers are of different types.

For example, a first one of the 3D printers 112, 114 may be of the first type such that the first 3D printer 112, 114 is able to manufacture a first printed 3D object using the first 3D printable model data 308. A second one of the 3D printers 112, 114 may be able to manufacture a second printed 3D object using the second 3D printable model data 310.

Even though the first and the second 3D printers 112 are different from each other, and therefore required different 3D printable model data, the manufactured second printed 3D object manufactured by the second 3D printer 112, 114 may be identical to, or nearly identical to, the first printed 3D object manufactured by the first 3D printer 112, 114. Or, the manufactured second printed 3D object manufactured by the second 3D printer 112, 114 may be very different from the first printed 3D object manufactured by the first 3D printer 112, 114 (having different size, different colors, differing complexities, etc.).

Continuing with the conceptual explanation of the data storage system 302, a third 3D printable model data 312 corresponds to a third 3D printable model that may be used to manufacture a third printed 3D object of the associated first physical object using a third type of 3D printer (denoted as "3D printer type 3"). Here, the third type of 3D printer is different from the first and second types of 3D printers. Further, an $n^{th}$ 3D printable model data 312 corresponds to an $n^{th}$ 3D printable model that may be used to manufacture another printed 3D object of the associated first physical object using an $n^{th}$ type of 3D printer (denoted as "3D printer type n"). Here, the $n^{th}$ type of 3D printer is different from the first, second and third types of 3D printers. Accordingly, it is appreciated that for a single physical object, data for many different 3D printable models may have been created and stored so that the same or similar physical object can be manufactured by a variety of different 3D printers 112, 114. In a practical application, there may be several different hundreds of, or even thousands of, different types of 3D printers 112, 114. Therefore, there may be several different hundreds of, or even thousands of, different types of 3D printable model data that have been generated and stored into the data storage system 302.

In the conceptual illustrated data storage system 302, a plurality of 3D printable model data for a single second physical object (denoted as "object 2") resides in a second portion 316 of the 3D model catalogue 304. The conceptual second 3D printable model data 318 corresponds to a first 3D printable model that may be used to manufacture a first printed 3D object of the associated first physical object using the first type of 3D printer (denoted as "3D printer type 1"). Similarly, a conceptual second 3D printable model data 320 corresponds to a second 3D printable model that may be used to manufacture a second printed 3D object of the associated same physical object also using the first type of 3D printer (denoted as "3D printer type 1"). Here, the first and second types of 3D printers are of identical, or nearly so identical to each other so as to be able to use the same model data.

However, the first and the second 3D printable model data 318, 320 are different from each other, even though both model data may be used by the same type of 3D printer 112, 114. Here, the printed 3D object manufactured using the first 3D printable model data 318 is different from the printed 3D object manufactured using the second 3D printable model data 320. The different manufactured printed 3D objects may have different sizes, different colors, differing complexities or levels of detail, different internal/external components, etc.

Similarly, the 3D printable model data 320 and the 3D printable model data 322 are different, and the printed 3D object manufactured using their model data will also be different. Accordingly, it is appreciated that in a practical application, there may be several different hundreds of, or even thousands of, different types of model data for the same physical object so that different forms of the printed 3D object corresponding to the same physical object may be manufactured by a single type of 3D printer 112, 114. Therefore, there may be several different hundreds of, or even thousands of, different types of 3D printable model data (generically illustrated as the 3D model data 324) corresponding to the same physical object that have been generated and stored into the data storage system 302.

Continuing with the conceptual explanation of the data storage system 302, a plurality of 3D printable model data for a single physical object (denoted as "object i") resides in a portion 326 of the 3D model catalogue 304. The conceptual first 3D printable model data 328 and the second 3D printable model data 330 correspond to different 3D printable models that may be used to manufacture a first printed 3D object and a second printed 3D object, respectively, of the associated $i^{th}$ physical object using a first type of 3D printer (denoted as "3D printer type 1"). Similarly, a conceptual third 3D printable model data 332 corresponds to another 3D printable model that may be used to manufacture a second printed 3D object of the associated $i^{th}$ physical object using a third type of 3D printer (denoted as "3D printer type 3"). A conceptual third 3D printable model data 334 corresponds to another 3D printable model that may be used to manufacture yet another printed 3D object of the associated $i^{th}$ physical object using the above described $n^{th}$ type of 3D printer (denoted as "3D printer type n").

Here, it is appreciated that the 3D printable model data 328 and the 3D printable model data 330 are different, and the printed 3D object manufactured using their model data manufactured using the first 3D printer type will be different from each other. And, even though the first and third types of 3D printers are of different types, manufactured printed 3D objects may be identical (or they may be different).

Further, if no 3D printable model data has been generated and/or stored for the second type of 3D printer (previously denoted as "3D printer type 2"), then the portion 326 would not have any 3D printable model data stored therein that is suitable for use by the second type of 3D printer 112, 114. For example, the second type of 3D printer may not be very popular, may not be commonly found in the possession of the user or at the remote sites, and/or may be a 3D printer of a competitor, such that 3D printable model data has never been generated for use by that particular second type of 3D printer.

Figure 4:
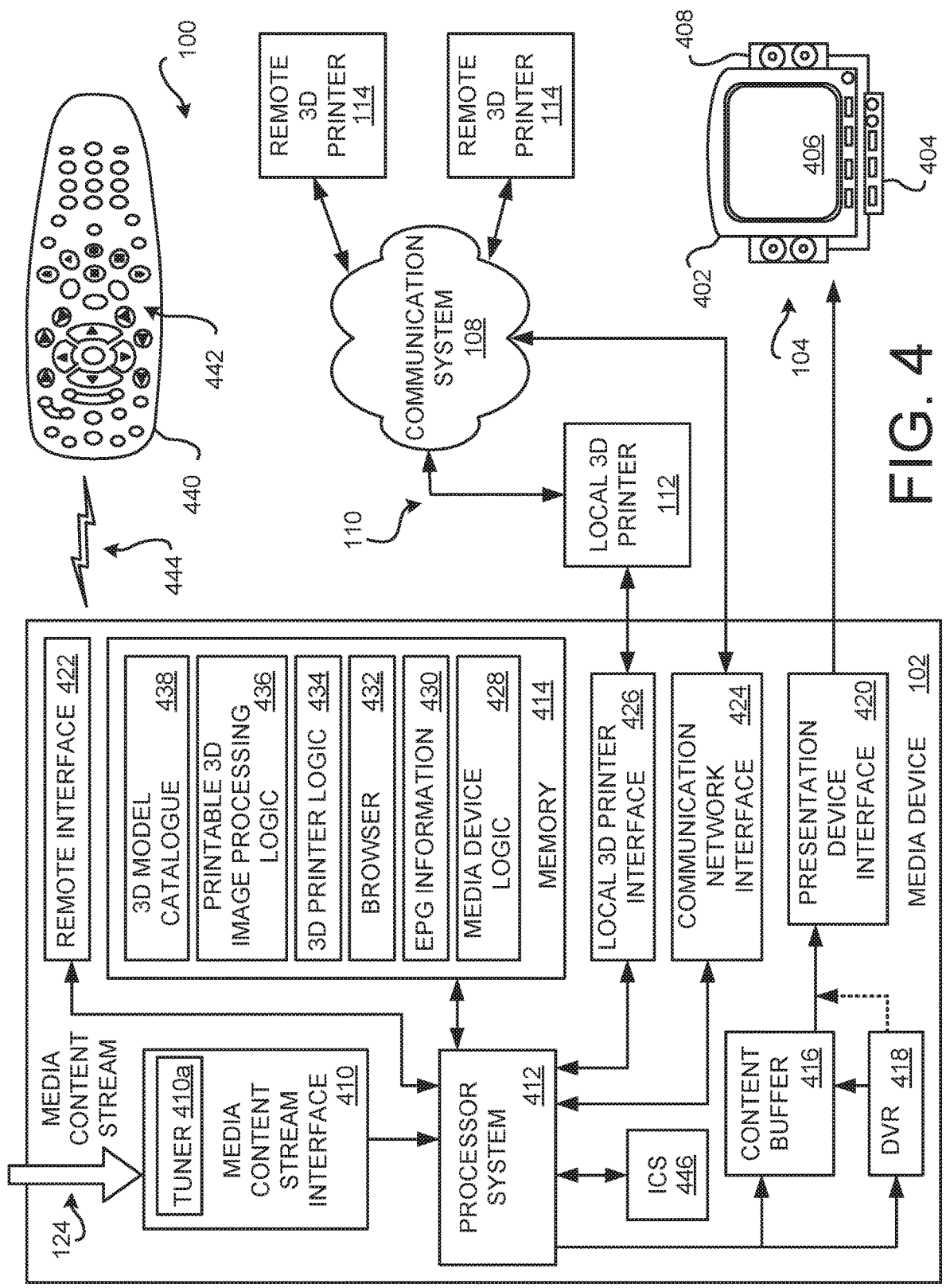
FIG. 4 is a block diagram of the media content and 3D printing system implemented in, and that is operable to control, a media device.

FIG. 4 is a block diagram of the media content and 3D printing system 100 implemented in, and that is operable to control, a media device 102. The exemplary media device 102 is communicatively coupled to a media presentation system 104 that includes a visual display device 402, such as a television (hereafter, generically a TV), and an audio presentation device 404, such as a surround sound receiver controlling an audio reproduction device. The video portion of the media content event is presented to a user on a display 406 of the visual presentation device 402. The audio portion of the media content is reproduced as audible sounds by one or more speakers 408 of the audio presentation device 404. Other types of output devices may also be coupled to the media device 102, including those providing any sort of stimuli sensible by a human being, such as temperature, vibration and the like. In some embodiments, the media device 102 and one or more of the components of the media presentation system 104 may be integrated into a single electronic device.

The non-limiting exemplary media device 102 comprises a media content stream interface 410, a processor system 412, a memory 414, a content buffer 416, an optional digital video recorder (DVR) 418, a presentation device interface 420, a remote interface 422, a communication network interface 424, and an optional local 3D printer interface 426. The memory 414 comprises portions for storing the media device logic 428, the electronic program guide (EPG) information 430, an optional browser 432, 3D printer logic 434, printable 3D image processing logic 436, and an optional 3D model catalogue 438. In some embodiments, the media device logic 428, the browser 432, the 3D printer logic 434, and/or the printable 3D image processing logic 436 may be integrated together, and/or may be integrated with other logic. In other embodiments, some or all of these memory and other data manipulation functions may be provided by using a remote server or other electronic devices suitably connected via the Internet or otherwise to a client device. Other media devices 102 may include some, or may omit some, of the above-described media processing components. Further, additional components not described herein may be included in alternative embodiments.

The functionality of the media device 102, here a set top box, is now broadly described. In a satellite broadcast system, a media content provider provides media content that is received in one or more media content streams 124 multiplexed together in one or more transport channels. The transport channels with the media content streams 124 are communicated to the media device 102 from a media system sourced from a remote head end facility (such as the media content broadcast facility 122 of FIG. 1) operated by the media content provider. The media device 102 is configured to receive one or more broadcasted satellite signals detected by the receiver antenna 138. Non-limiting examples of other media systems that broadcast a media content stream 124 include a cable system 144, an OTA system 140 that utilizes a radio frequency (RF) communication system, and the Internet (that utilized a portion of the communication system 108).

The one or more media content streams 124 are received by the media content stream interface 410. One or more tuners 410a in the media content stream interface 410 selectively tune to one of the media content streams 124 in accordance with instructions received from the processor system 412. The processor system 412, executing the media device logic 428 and based upon a request for a media content event of interest specified by a user, parses out media content associated with the media content event of interest. The media content event of interest is then assembled into a stream of video and/or audio information which may be stored by the content buffer 416 such that the media content can be streamed out to components of the media presentation system 104, such as the visual display device 402 and/or the audio presentation device 404, via the presentation device interface 420. Alternatively, or additionally, the parsed out media content may be saved into the DVR 418 for later presentation. The DVR 418 may be directly provided in, locally connected to, or remotely connected to, the media device 102. In alternative embodiments, the media content streams 124 may stored for later decompression, processing and/or decryption.

From time to time, information populating the EPG information 430 portion of the memory 414 is communicated to the media device 102, via the media content stream 124 or via another suitable media. The EPG information 430 portion of the memory 414 stores the information pertaining to the scheduled programming of a plurality of media content events. The information may include, but is not limited to, a scheduled presentation start and/or end time, a program channel, and descriptive information for the plurality of media content events. The program's descriptive information may include the title of the media content event, names of performers or actors, date of creation, and a summary describing the nature of the media content event. Any suitable information may be included in the program's supplemental information, including an indication that 3D printable models (and/or 3D printable model data) associated with a particular media content event are available to the user. Upon receipt of a command from the user requesting presentation of an EPG display, the information in the EPG information 430 portion of the memory 414 is retrieved, formatted, and then presented on the display 406 as an EPG.

As noted above, one or more 3D printable models and/or 3D printable model data may be communicated to and then stored in the 3D model catalogue 438. Such 3D printable models and/or 3D printable model data may be communicated to and stored by the media device 102 in a manner similar to, or the same as, used for the distribution of EPG information to the media device 102. When the printed 3D object corresponding to the physical object of interest is to be manufactured, the media device 102 communicates the 3D printable model data to the designated 3D printers 112, 114 with instructions to manufacture the printed 3D object. Alternatively, if a designated remote 3D printer 114 is used, the remote 3D model site 106 communicates the 3D printable model data directly to designated remote 3D printer 114 with instructions to manufacture the printed 3D object.

The exemplary media device 102 is configured to receive commands from a user via a remote control 440. The remote control 440 includes one or more controllers 442 disposed on the surface of the remote control 440. The user, by actuating one or more of the controllers 442, causes the remote control 440 to generate and transmit commands, via a wireless signal 444, to the media device 102. Preferably, each individual one of the controllers 442 has a specific predefined function that causes a specific operation by the media device 102 and/or by components of the media presentation system 104. For example, one of the controllers may be configured to access and present the example GUI 202 (FIG. 2A), and/or navigate about the GUI 202. The commands communicated from the remote control 440 then control the media device 102 and/or control components of the media presentation system 104. The wireless signal 444 may be an infrared (IR) signal or a radio frequency (RF) signal that is detectable by the remote interface 422.

As noted above, a user (not shown) may view and see a list of various 3D printable models and/or 3D printable model data that is compatible with the 3D printers 112, 114 that the user has access to. That is, based upon the user commands, typically generated at and transmitted from the remote control 440 as the wireless signal 444 that is received by the remote interface 422, the media device 102 can then control itself and/or other various media devices that it is communicatively coupled to obtain and/or manage available 3D printable models and/or 3D printable model data, and/or to initiate the manufacturing process of printed 3D object of interest.

The processes performed by the media device 102 relating to the processing of the received media content stream 124 and communication of a presentable media content event to the components of the media presentation system 104 are generally implemented by the processor system 412 while executing the media device logic 428. Thus, the media device 102 may perform a variety of functions related to the processing and presentation of one or more media content events received in the media content stream 124.

When the user is viewing a presented media content event, and becomes aware of a physical object (that is, views an image of a physical object in a scene of the presented media content event), the user may initiate the process of acquiring a 3D printable model and/or the 3D printable model data that is associated with the viewed physical object. The processes performed by the media device 102 relating to acquiring a 3D printable model, acquiring the associated 3D printable model data, and/or initiating manufacture of the associated printed 3D object, are generally implemented by the processor system 412 while executing the 3D printer logic 434.

In an example embodiment, acquired 3D printable models and/or acquired 3D printable model data is optionally saved into the 3D model catalogue 438. The 3D model catalogue 438 may be organized and maintained similar to the above-described 3D model catalogue 304 (FIG. 3).

In an example embodiment, one of the controllers 442 may be predefined to initiate the process of acquiring the 3D printable models and/or 3D printable model data, and/or for initiating the manufacture of a printed 3D object associated with a viewed physical object. When the user actuates the designated controller 442, a first example embodiment optionally pauses the presentation of the media content event, captures an image (a still image or a short video clip) of the currently presenting scene of the media content event, and generates the initial user request that is communicated to the remote 3D model site 106. The communicated initial user request may include the capture of an image that shows the physical object of interest. Then, the remote 3D model site 106 may identify the physical object of interest and start the process of identifying candidate 3D printable models and/or 3D printable model data that is compatible for use with the 3D printers 112, 114 that the user has access to. Meanwhile, presentation of the media content event to the user continues.

In an alternative embodiment, the optional printable 3D image processing logic 436 is retrieved and executed by the processor system 412 to identify the physical object of interest from the capture image of the current scene. Then, the initial user request is generated and communicated to the remote 3D model site 106. Here, the physical object of interest has been identified by the printable 3D image processing logic 436. The identification information that identifies the physical object of interest is then included in the communicated initial user request.

In some embodiments, the media device 102 may have an optional image capture system (ICS) 446. The ICS 446 may be any suitable system that is configured to capture a photograph and/or video by the user. In some situations, the user may see a physical object of interest, capture an image of the physical object of interest (a still image, multiple still images, and/or a video clip), and then communicate the captured image(s) to the remote 3D model site 106. The remote 3D model site 106 may then attempt to identify the physical object of interest shown in the image(s). If the physical object of interest can be identified, then information corresponding to the identified candidate available 3D printable models (and/or the 3D printable model data) may be communicated to the media device 102 (and/or to another media device 102).

In some instances, the remote 3D model site 106 may not be able to identify any available 3D printable models (and/or the 3D printable model data) that are associated with the physical object of interest shown in the captured image(s). A request may then be sent to a model developer organization or individual for development of one or more 3D printable models (and/or the 3D printable model data) that are associated with the identified physical object of interest. In some situations, if a relatively large number of model requests are received from different users, new and/or very detailed 3D printable models (and/or the 3D printable model data) may be developed for sale or other commercial reasons.

In some embodiments, a learning algorithm in the 3D printer logic 434 filters or limits the number of printing options 204 presented on the GUI 202 of FIG. 2A. Based on the user's prior choices to use a particular one of the available 3D printers 112, 114, the learning algorithm may then limit the indication of candidate available 3D printable models (and/or the 3D printable model data) to the user based on the user's prior preferences for particular 3D printers 112, 114.

Alternatively, or additionally, the learning algorithm may be configured to learn the user's preferences for the type of printed 3D objects. For example, the user may prefer simple and/or relatively small printed 3D objects, such as when toys for a child are printed based on an animation-based media content event. Thus, relatively complex and/or large detailed available 3D printable models (and/or the 3D printable model data) are not typically presented to the user based on the user's learned preference for simple and/or relatively small printed 3D objects. Conversely, the user may prefer complex, detailed, and/or relatively large printed 3D objects, such as when the user is a hobbyist and is collecting detailed models of physical objects of interest for their collection. Thus, relatively simple and/or small available 3D printable models (and/or the 3D printable model data) are not presented to the user based on the user's learned preference for complex, detailed, and/or relatively large printed 3D objects.

Alternatively, or additionally, the learning algorithm may be configured to learn the user's preferences based on the cost of available 3D printable models (and/or the 3D printable model data) and/or the cost of printed 3D objects. For example, the user may prefer less expensive printed 3D objects, such as when toys for a child are printed based on an animation-based media content event. Thus, relatively expensive available 3D printable models (and/or the 3D printable model data) are not presented to the user based on the user's learned preference for cheaper 3D printable models (and/or the 3D printable model data). Conversely, the user may prefer more expensive available 3D printable models (and/or the 3D printable model data) and/or printed 3D objects. Thus, relatively less expensive options are not presented to the user based on the user's learned preference for the more expensive options.

In some embodiments, the remote 3D model site 106 and/or the media device 102 are operable to automatically make modifications and/or adjustments to a particular available 3D printable model (and/or the 3D printable model data) that the user has selected. Alternatively, the modification may be made under the direction of the user who is providing specific modification instructions via their media device 102 and/or another suitable user interface device.

For example, the size and/or resolution of the printed 3D object may be scaled (an increase or decrease in size) from the initial size of the printed 3D object when manufactured in accordance with the original available 3D printable model (and/or the 3D printable model data). That is, the size and/or resolution of the printed 3D object may be changed from a first size and/or resolution to a different size and/or resolution of interest. Thus, when size is modified, the 3D printable model data would be scaled in accordance with a user instruction that indicates a scaling level that is to be applied to the data. The modification may be specified by the user, or may be automatically modified by the media device 102 or the remote 3D model site 106 based on learned user preferences and/or based on the 3D printers 112, 114 that the user will be using to manufacture the printed 3D object. For example, a user-selected 3D printer 112, 114 may have a size limit for printed 3D objects that it can manufacture. Here, the size of the printed 3D object specified by the original 3D printable model (and/or the 3D printable model data) may be scaled down (reduced) so as to fit the size limitations of the selected 3D printer 112, 114. Similarly, resolution of the printed 3D object may be reduced when the selected 3D printer 112, 114 is limited in the degree of resolution of a printed 3D object that it is able to manufacture.

Alternatively, or additionally, color changes to the printed 3D object may be made by the user. Here, the user may specify specific colors to be used for the printed 3D object and/or selected portions of the printed 3D object using their media device 102. In an example embodiment, the user is presented an image, or multiple images, of the printed 3D object as if manufactured in accordance with the unmodified 3D printable model (and/or the 3D printable model data). The user is then permitted to select portions of the image of the physical object of interest, and then specify a change in color that is to be used during manufacture of the printed 3D object. Or, the user may change the color of the entire printed 3D object that is to be manufactured. For example, a user-selected 3D printer 112, 114 may have a limited number of and/or shades of color that are available for printed 3D objects that it can manufacture. Here, the colors of the printed 3D object specified by the original 3D printable model (and/or the 3D printable model data) may be modified so as to conform to the color limitations of the selected 3D printer 112, 114.

Alternatively, or additionally, some available 3D printable models (and/or the 3D printable model data) may provide for external components and/or for internal components. If the selected 3D printer 112, 114 is not configured to manufacture external components and/or internal components, the media device 102 and/or the remote 3D model site 106 may automatically modify the original 3D printable model (and/or the 3D printable model data) so as to conform to the limitations of the selected 3D printer 112, 114. Alternatively, or additionally, the user may modify the original 3D printable model (and/or the 3D printable model data) to selectively exclude one or more external components and/or internal components, particularly if such modifications reduce the cost of the printed 3D object.

After the manufacture of a printed 3D object, some embodiments are configured to report the manufacture of the printed 3D object to the remote 3D model site 106 and/or to another remote site, preferably via the communication system 108. If the printed 3D object is manufactured by a remote 3D printer 114, then the information may be communicated from there. Communicated information may include information that identifies the particular 3D printable model (and/or the 3D printable model data) used to manufacture the printed 3D object. The information may be used to identify the user. The information may be used for further marketing to other users. If many instances are reported from different users, additional or alternative 3D printable models (and/or the 3D printable model data) may be developed. Other 3D printable models (and/or the 3D printable model data) for related objects of interest may be developed. For example, when there is a high degree of user interest for one or more physical objects of interest shown in a particular media content event, 3D printable models (and/or the 3D printable model data) may be developed for other physical objects (actors, structures, vehicles, etc.) also shown in the media content event.

Cost information to acquire the particular 3D printable model (and/or the 3D printable model data) and/or to manufacture the printed 3D object may optionally be reported to the remote 3D model site 106 and/or to another remote site. Thus, fess collected may be shared among interested parties, such as the developers of the particular 3D printable model (and/or the 3D printable model data) and/or the marketers who marketed the particular 3D printable model (and/or the 3D printable model data).

It should be emphasized that the above-described embodiments of the media content and 3D printing system 100 are merely possible examples of implementations of the invention. Many variations and modifications may be made to the above-described embodiments. All such modifications and variations are intended to be included herein within the scope of this disclosure and protected by the following claims.

The invention claimed is:

1. A media device, comprising:
a presentation device interface that is communicatively coupled to a display,
wherein the presentation device interface communicates a media content stream to the display so that a visual portion of a media content event is presented on the display to a user,
at least one tuner receives the media content stream that has the media content event,
wherein the media content event includes a trigger embedded in the media content stream at a predefined location that corresponds to a time of presentation of a physical object that is associated with the trigger, and wherein the trigger includes presentable trigger information that identifies the physical object that is being shown on the display to the user;
wherein the trigger includes information corresponding to one of an icon or a visual graphic element that is shown on the display, and
wherein the icon or the visual graphic element presents visual information to the user that identifies the physical object to indicate to the user that there is at least one 3D printable model that is available for printing a 3D printed object that represents the physical object,
a communication network interface that communicatively couples the media device through a printer interface to a 3D printer that is used to manufacture 3D printed objects; and
a processor system that is communicatively coupled to the presentation device interface, the at least one tuner and to the communication network interface, wherein the processor system is configured to:
communicate the trigger information to the display in response to receiving the trigger in the media content stream so that trigger information is presented on the display to the user; and receive a user request while the trigger information is being presented on the display, wherein the user request indicates that the user wishes to acquire a 3D printed object corresponding to the physical object that is being presented on the display,
wherein 3D printable model data corresponding to the physical object shown in the media content event that is associated with the trigger is communicated to the 3D printer to initiate a manufacture of the 3D printed object in response to receiving the user request.

2. The media device of claim 1, wherein the processor system is further configured to:
concurrently present the trigger information on the display with a continuing presentation of the media content event,
wherein the trigger information is presented for at least the duration that the physical object is visible on the display.

3. The media device of claim 1, wherein the processor system is further configured to:
pause presentation of the media content event while the trigger information is presented on the display,
wherein presentation of the trigger information ends after a predefined duration or in response to receiving the user request, and
wherein presentation of the media content event resumes in response to ending presentation of the trigger information.

4. The media device of claim 1, wherein the user request is generated by a remote control that is in communication with the media device.

5. The media device of claim 1, wherein the communication network interface communicatively couples the media device to a remote 3D model site via a communication system, and wherein the processor system is further configured to:
communicate information corresponding to the user request to the remote 3D model site via the communication network interface in response to receiving the user request;
receive the 3D printable model data from the remote 3D model site in response to communicating the user request to the remote 3D model site; and
communicate the received 3D printable model data from the media device to the 3D printer to initiate the manufacture of the 3D printed object that represents the physical object.

6. The media device of claim 5, further comprising a memory that stores at least the received 3D printable model data, wherein the processor system is further configured to:
receive a user confirmation after the 3D printable model data has been stored in the memory, wherein the user confirmation confirms that the user wishes to acquire the 3D printed object that represents the physical object that was presented on the display when the trigger received; and
retrieve the 3D printable model data from the memory for communication to the 3D printer to initiate the manufacture of the 3D printed object using the 3D printer.

7. The media device of claim 5, wherein the processor system is further configured to:
receive a plurality of different 3D printable models from the remote 3D model site in response to communicating the user request to the remote 3D model site, wherein each of the plurality of different 3D printable models correspond to the physical object shown in the media content event that is associated with the trigger, and wherein each of the plurality of different 3D printable models are associated with 3D printable model data that can be used to print a unique 3D printed object that represents the physical object;

communicate a graphical user interface (GUI) to the display in response to receiving the plurality of different 3D printable models, wherein the presented GUI presents images corresponding to each of the plurality of 3D printable models; and receive a user selection, via the presented GUI, of one of the plurality of different 3D printable models, wherein the 3D printable model data associated with the selected 3D printable model is used by the 3D printer to print the user selected unique 3D printed object.

8. The media device of claim 7, wherein the plurality of different 3D printable models comprises a first plurality of 3D printable models and a second plurality of 3D printable models, wherein the first plurality of 3D printable models are suitable for printing using a first type of 3D printer, and wherein the second plurality of 3D printable models are suitable for printing using a second type of 3D printer that is different from the first type of 3D printer, wherein the processor system is further configured to:

determine that the 3D printer that is communicatively coupled to the media device is of the first type of 3D printer, wherein the presented GUI presents images corresponding to each of the first plurality of 3D printable models, and wherein the presented GUI omits images corresponding to each of the second plurality of 3D printable models.

9. The media device of claim 1, wherein the communication network interface communicatively couples the media device to a remote 3D model site via a communication system, and wherein the processor system is further configured to:

communicate information corresponding to the user request to the remote 3D model site via the communication network interface in response to receiving the user request, wherein the remote 3D model site communicates the 3D printable model data to the 3D printer in response to receiving the information corresponding to the user request, and wherein the 3D printer to initiates the manufacture of the 3D printed object that represents the physical object in response to receiving the 3D printable model data from the remote 3D model site.

10. The media device of claim 9, wherein the processor system is further configured to:

receive 3D model information corresponding to a plurality of different 3D printable models from the remote 3D model site in response to communicating the information corresponding to the user request to the remote 3D model site, wherein each of the plurality of different 3D printable models correspond to the physical object shown in the media content event that is associated with the trigger, and wherein each of the plurality of different 3D printable models are associated with 3D printable model data that can be used to print a unique 3D printed object that represents the physical object;

communicate a graphical user interface (GUI) to the display in response to receiving the plurality of different 3D printable models, wherein the presented GUI presents images corresponding to each of the plurality of 3D printable models;

receive a user selection, via the presented GUI, of one of the plurality of different 3D printable models; and communicate information corresponding to the user selection to the remote 3D model site in response to receiving the user selection of one of the plurality of different 3D printable models, wherein the 3D printable model data identified in the user selection is communicated from the remote 3D model site to the 3D printer to print the 3D printed object.

11. The media device of claim 1, wherein the 3D printer is one of a local 3D printer and a remote 3D printer, wherein the media device further comprises a printer interface that is communicatively coupled to the processor system and that communicatively couples the media device directly to the local 3D printer, and wherein the processor system is further configured to:

receive a user selection that selects one of the local 3D printer and the remote 3D printer to be used to print the 3D printed object that represents the physical object;

communicate information corresponding to the user selection to the remote 3D model site;

receive the 3D printable model data from the remote 3D model site when the user selection selects the local 3D printer; and communicate, via the printer interface, the received 3D printable model data to the local 3D printer;

wherein the 3D printable model data is communicated from the remote 3D model site to the remote 3D printer when the second user selection selects the remote 3D printer, and wherein the selected local 3D printer or the remote 3D printer that receives the 3D printable model data initiates the manufacture of the 3D printed object in response to receiving the 3D printable model data.

12. The media device of claim 1, wherein the 3D printer is one of a local 3D printer and a remote 3D printer, wherein the media device further comprises a printer interface that is communicatively coupled to the processor system and that communicatively couples the media device directly to the local 3D printer, wherein the communication network interface communicatively couples the remote 3D printer to the media device via a communication system, and wherein the processor system is further configured to:

receive a user selection that selects one of the local 3D printer and the remote 3D printer to be used to print the 3D printed object that represents the physical object;

communicate, via the printer interface, the 3D printable model data to the local 3D printer when the user selection selects the local 3D printer; and communicate, via the communication network interface, the 3D printable model data to the remote 3D printer when the user selection selects the remote 3D printer, wherein the selected local 3D printer or the remote 3D printer that receives the 3D printable model data initiates the manufacture of the 3D printed object in response to receiving the 3D printable model data.

13. The media device of claim 1, further comprising a memory that stores at least the received 3D printable model data, wherein after receiving the user request that indicates that the user wishes to acquire the 3D printed object corresponding to the physical object shown in the media content event that is associated with the trigger, the processor is further configured to:
- store the user request in the memory;
- present a confirmation graphical user interface (GUI) after the conclusion of presentation of the media content event, wherein the confirmation GUI presents information corresponding to the stored user request; and
- receive a user confirmation via the confirmation GUI, wherein the user confirmation confirms that the user still wishes to acquire the 3D printed object corresponding to the physical object that was being presented on the display when the trigger information was presented,
- wherein the 3D printable model data that initiates the manufacture of the 3D printed object corresponding to the physical object is communicated to the 3D printer in response to receiving the user confirmation.

14. A method performed at a media device, comprising:
- receiving a streaming media content event through at least one tuner that includes a trigger embedded in the media content event at a predefined location that corresponds to a time of presentation of an image of a physical object that is shown in the media content event;
- communicating the media content event to a display through a presentation device interface so that a visual portion of the media content event is presented on the display to a user;
- receiving the trigger in the streaming media content event, wherein the trigger includes presentable trigger information that identifies the physical object shown in the visual portion of the media content event that is being presented on the display to the user;
- communicating the presentable trigger information to the display through a processor system in response to receiving the trigger in the media content event, wherein the trigger information is presented on the display to the user,
- wherein the trigger includes information corresponding to one of an icon or a visual graphic element that is shown on the display, and wherein the icon or the visual graphic element presents visual information to the user that identifies the physical object to indicate to the user that there is at least one 3D printable model that is available for printing a 3D printed object that represents the physical object; and
- wherein the processor system is communicatively coupled to the presentation device interface, the at least one tuner and a communication network interface which is communicatively couples the media device through a printer interface to a 3D printer that is used to manufacture the 3D printed objects;
- receiving a user request while the trigger information is being presented on the display, wherein the user request indicates that the user wishes to acquire a 3D printed object corresponding to the physical object that is being presented on the display,
- wherein 3D printable model data is communicated to the 3D printer to initiate a manufacture of the 3D printed object corresponding to the physical object shown in the media content event that is associated with the trigger.

15. The method of claim 14, further comprising:
- concurrently presenting the trigger information and the media content event on the display during a continuing presentation of the media content event,
- wherein the trigger information is presented for at least the duration that the physical object is visible on the display.

16. The method of claim 14, further comprising:
- pausing presentation of the media content event while the trigger information is presented on the display;
- ending presentation of the trigger information after a predefined duration or in response to receiving the user request; and
- resuming presentation of the media content event in response to ending presentation of the trigger information.

17. The method of claim 14, wherein the media device is communicatively coupled to a remote 3D model site via a communication system, the method further comprising:
- communicating information corresponding to the user request to the remote 3D model site via the communication system in response to receiving the user request;
- receiving, at the media device, 3D printable model data from the remote 3D model site in response to communicating the information corresponding to the user request to the remote 3D model site; and
- communicating the received 3D printable model data to the 3D printer to initiate the manufacture of the 3D printed object that represents the physical object.

18. The method of claim 14, wherein the media device is communicatively coupled to a remote 3D model site via a communication system, the method further comprising:
- communicating information corresponding to the user request to the remote 3D model site via the communication system in response to receiving the user request,
- wherein the remote 3D model site communicates the 3D printable model data to the 3D printer in response to receiving the information corresponding to the user request, and
- wherein the 3D printer to initiates the manufacture of the 3D printed object that represents the physical object in response to receiving the 3D printable model data from the remote 3D model site.

19. The method of claim 14, wherein the media device is communicatively coupled to a remote 3D model site via a communication system, the method further comprising:
- receiving information corresponding to a plurality of different 3D printable models from the remote 3D model site in response to communicating the information corresponding to the user request to the remote 3D model site,
  - wherein each of the plurality of different 3D printable models correspond to the physical object shown in the media content event that is associated with the trigger, and
  - wherein each of the plurality of different 3D printable models are associated with 3D printable model data that can be used to print a unique 3D printed object that represents the physical object;
- communicating a graphical user interface (GUI) to the display in response to receiving the plurality of different 3D printable models, wherein the presented GUI presents the received information corresponding to each of the plurality of 3D printable models; and
- receiving a user selection, via the presented GUI, of one of the plurality of different 3D printable models,
- wherein the 3D printable model data associated with the selected 3D printable model is used by the 3D printer to print the user selected unique 3D printed object.

20. The method of claim 14, wherein the 3D printer is one of a local 3D printer and a remote 3D printer, and wherein the media device is directly coupled to the local 3D printer, the method further comprising:
- receive a user selection that selects one of the local 3D printer and the remote 3D printer to be used to print the 3D printed object that represents the physical object;
- communicating information corresponding to the user selection to the remote 3D model site; and
- receiving the 3D printable model data from the remote 3D model site when the user selection selects the local 3D printer, wherein the 3D printable model data is communicated from the media device to the local 3D printer,
- wherein the 3D printable model data is communicated from the remote 3D model site to the remote 3D printer when the user selection selects the remote 3D printer, and
- wherein the selected local 3D printer or the remote 3D printer that receives the 3D printable model data initiates the manufacture of the 3D printed object in response to receiving the 3D printable model data.

21. The method of claim 14, wherein after receiving the user request that indicates that the user wishes to acquire the 3D printed object corresponding to the physical object shown in the media content event that is associated with the trigger, the processor is further configured to:
- storing the user request in a memory of the media device;
- presenting a confirmation graphical user interface (GUI) after the conclusion of presentation of the media content event, wherein the confirmation GUI presents information corresponding to the stored user request; and
- receiving a user confirmation via the confirmation GUI, wherein the user confirmation confirms that the user still wishes to acquire the 3D printed object corresponding to the physical object that was being presented on the display when the trigger information was presented,
- wherein the information to initiate the manufacture of the 3D printed object corresponding to the physical object is communicated to the 3D printer in response to receiving the user confirmation.

* * * * *